US012456828B2

(12) United States Patent
Fan et al.

(10) Patent No.: US 12,456,828 B2
(45) Date of Patent: Oct. 28, 2025

(54) HYBRID CARD EDGE CONNECTOR

(71) Applicant: Amphenol Commercial Products (Chengdu) Co., Ltd., Chengdu (CN)

(72) Inventors: Jun Fan, Chengdu (CN); Tao Zeng, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 449 days.

(21) Appl. No.: 17/967,730

(22) Filed: Oct. 17, 2022

(65) Prior Publication Data

US 2023/0120108 A1 Apr. 20, 2023

(30) Foreign Application Priority Data

Oct. 18, 2021 (CN) ......................... 202111209436.8
Oct. 18, 2021 (CN) ......................... 202122503165.9

(51) Int. Cl.
*H01R 12/72* (2011.01)
*H01R 12/58* (2011.01)
(Continued)

(52) U.S. Cl.
CPC ........... *H01R 12/721* (2013.01); *H01R 12/58* (2013.01); *H01R 12/7005* (2013.01);
(Continued)

(58) Field of Classification Search
CPC .. H01R 12/721; H01R 12/58; H01R 12/7005; H01R 13/2407; H01R 13/516; H01R 13/629
(Continued)

(56) References Cited

U.S. PATENT DOCUMENTS 4,040,713 A 8/1977 Konnemann
4,687,267 A 8/1987 Header et al.
(Continued)

FOREIGN PATENT DOCUMENTS

CN 1275825 A 12/2000
CN 201956473 U * 8/2011
(Continued)

OTHER PUBLICATIONS

Chinese Office Action dated Jul. 4, 2022 in connection with Chinese Application No. 201980089491.2.
(Continued)

*Primary Examiner* — Peter G Leigh
(74) *Attorney, Agent, or Firm* — Wolf, Greenfield & Sacks, P.C.

(57) ABSTRACT

A card edge connector for transmitting signal and power simultaneously. The connector has two or more types of conductors held by a housing. First and second types of conductors are configured for transmitting signal and power, respectively. The housing has a slot for receiving a mating component. The housing has first and second types of grooves for holding the first and second types of conductors, respectively, such that the conductors can sustain a similar amount of force generated when mating with the mating component. The conductors have mating ends with contact portions curving into the slot and mounting ends opposite the mating ends and extending out of the housing. The mating and mounting ends of the first and second types of conductors are configured such that they can be deflected by the mating component simultaneously and mounted to a printed circuit board using a same process.

20 Claims, 14 Drawing Sheets

(51) Int. Cl.

| | |
|---|---|
| ***H01R 12/70*** | (2011.01) |
| ***H01R 13/24*** | (2006.01) |
| ***H01R 13/516*** | (2006.01) |
| ***H01R 13/629*** | (2006.01) |

(52) U.S. Cl.
CPC ....... *H01R 13/2407* (2013.01); *H01R 13/516* (2013.01); *H01R 13/629* (2013.01)

(58) Field of Classification Search
USPC .......................................................... 439/629
See application file for complete search history.

(56) References Cited

U.S. PATENT DOCUMENTS

| | | | | |
|---|---|---|---|---|
| 4,734,041 | A | 3/1988 | Bruchmann et al. | |
| 5,024,609 | A | 6/1991 | Piorunnek | |
| 5,162,002 | A | 11/1992 | Regnier | |
| 6,645,012 | B2 | 11/2003 | Ito et al. | |
| 6,652,322 | B2 | 11/2003 | Ito et al. | |
| 6,685,512 | B2 | 2/2004 | Ooya | |
| 7,104,812 | B1 | 9/2006 | Bogiel et al. | |
| 7,247,062 | B1 | 7/2007 | Polnyi | |
| 7,252,523 | B1 * | 8/2007 | Pennypacker | H01R 12/7005 439/157 |
| 7,637,783 | B2 | 12/2009 | Sasaoka et al. | |
| 7,985,097 | B2 | 7/2011 | Gulla | |
| 8,282,402 | B2 * | 10/2012 | Ngo | H01R 13/6273 439/79 |
| 8,632,365 | B2 * | 1/2014 | Ngo | H01R 12/7011 439/636 |
| 9,054,456 | B2 | 6/2015 | Orris et al. | |
| 9,070,990 | B2 | 6/2015 | Flickinger et al. | |
| 9,608,349 | B2 | 3/2017 | Mashiyama et al. | |
| 9,666,962 | B1 | 5/2017 | Bucher | |
| 9,941,613 | B2 | 4/2018 | Zhao | |
| 9,966,679 | B2 | 5/2018 | Xu et al. | |
| 10,096,920 | B2 | 10/2018 | Lee | |
| 10,128,589 | B2 | 11/2018 | Yamaguchi | |
| 10,637,175 | B1 | 4/2020 | Zou et al. | |
| 10,873,146 | B2 | 12/2020 | Zou et al. | |
| 2002/0119704 | A1 | 8/2002 | Ito et al. | |
| 2006/0094277 | A1 * | 5/2006 | Yang | H01R 12/83 439/328 |
| 2011/0053388 | A1 * | 3/2011 | Zhu | H05K 1/142 439/62 |
| 2011/0151701 | A1 * | 6/2011 | Ngo | H01R 12/732 439/327 |
| 2011/0300759 | A1 * | 12/2011 | Ngo | H01R 12/7052 439/630 |
| 2011/0300760 | A1 * | 12/2011 | Ngo | H01R 12/721 439/636 |
| 2013/0088843 | A1 * | 4/2013 | Cong | G06F 1/185 361/785 |
| 2014/0370759 | A1 * | 12/2014 | Tai | H01R 12/724 439/629 |
| 2015/0162683 | A1 * | 6/2015 | Hung | H01R 12/724 439/485 |
| 2018/0212344 | A1 | 7/2018 | Li et al. | |
| 2020/0161791 | A1 * | 5/2020 | Zou | H01R 13/2492 |
| 2022/0013942 | A1 | 1/2022 | Guo et al. | |
| 2022/0021142 | A1 | 1/2022 | Copper et al. | |

FOREIGN PATENT DOCUMENTS

| | | | | |
|---|---|---|---|---|
| CN | 102804512 | A | | 11/2012 |
| CN | 202817299 | U | * | 3/2013 |
| CN | 204668547 | U | | 9/2015 |
| CN | 205081255 | U | * | 3/2016 |
| CN | 205248509 | U | * | 5/2016 |
| CN | 205583210 | U | | 9/2016 |
| CN | 205846279 | U | | 12/2016 |
| CN | 106299769 | A | | 1/2017 |
| CN | 206301977 | U | | 7/2017 |
| CN | 206727256 | U | | 12/2017 |
| CN | 207381578 | U | | 5/2018 |
| CN | 109326909 | A | | 2/2019 |
| CN | 208939193 | U | | 6/2019 |
| DE | 102017213140 | A1 | | 2/2018 |
| JP | 2016-110966 | A | | 6/2016 |
| TW | M422792 | U | | 2/2012 |
| TW | M561346 | U | | 6/2018 |
| WO | WO 2017/193684 | A1 | | 11/2017 |

OTHER PUBLICATIONS

International Preliminary Report on Patentability mailed Jun. 3, 2021 in connection with International Application No. PCT/CN2019/095891.

International Preliminary Report on Patentability mailed Jun. 3, 2021 in connection with International Application No. PCT/CN2019/095899.

International Search Report and Written Opinion mailed Oct. 14, 2019 in connection with International Application No. PCT/CN2019/095899.

International Search Report and Written Opinion mailed Sep. 27, 2019 in connection with International Application No. PCT/CN2019/095891.

Taiwanese Office Action dated Oct. 5, 2022 in connection with Taiwanese Application No. 108142216.

[No Author Listed], New Product: High Density Plus (HD+) Card Edge Power Connectors. TE Connectivity. Nov. 27, 2018. 3 pages. URL:https://www.te.com/usa-en/about-te/news-center/new-hd-plus-card-edge-connectors.html [retrieved on May 18, 2021].

* cited by examiner

HYBRID CARD EDGE CONNECTOR

RELATED APPLICATIONS

This application claims priority to and the benefit of Chinese Patent Application Serial No. 202122503165.9, filed on Oct. 18, 2021, entitled "HYBRID CARD EDGE CONNECTOR." This application also claims priority to and the benefit of Chinese Patent Application Serial No. 202111209436.8, filed on Oct. 18, 2021, entitled "HYBRID CARD EDGE CONNECTOR." The entire contents of these applications are incorporated herein by reference in their entirety.

FIELD

This patent application relates generally to interconnection systems, such as those including electrical connectors, used to interconnect electronic assemblies.

BACKGROUND

Electrical connectors are used in many electronic systems. It is generally easier and more cost effective to manufacture a system as several printed circuit boards (PCB) which may be joined together with electrical connectors than to manufacture the system as a single assembly. A known arrangement for joining several PCBs is to have one PCB as a backplane. Then, other PCBs, called "daughterboards" or "daughtercards", may be connected through the backplane.

A known backplane is a PCB onto which many connectors may be mounted. Conducting traces in the backplane may be electrically connected to signal conductors in the connectors so that signals may be routed between the connectors. Signals may be routed among daughtercards through the connectors and the backplane. For example, daughtercards may also have connectors mounted thereon. The connectors mounted on a daughtercard may be plugged into the connectors mounted on the backplane.

Electrical connector designs have been adapted to mirror trends in the electronic industry. Electronic systems have generally become smaller, faster and more complex in functions. These changes mean that the number of circuits in a given area of an electronic system, along with the frequencies at which the circuits operate have increased significantly in recent years. Current systems pass more data between the printed circuit boards and requires electrical connectors which can electrically process more data at a higher speed than the electrical connectors of even a few years ago.

Card edge connectors may be used to connect daughtercards, sometimes referred to as add-in cards, to a backplane, such that the storage and/or function abilities of the backplane may be expanded by the daughtercards.

BRIEF SUMMARY

Aspects of the present disclosure relate to hybrid electrical connectors that can transmit signals and power simultaneously.

Some embodiments relate to a card edge connector. The card edge connector may include a housing comprising first and second walls extending in a longitudinal direction and separated from each other by a slot, and one or more ribs joining the first and second walls and separating the slot into two or more portions; a plurality of first type conductors, each of the plurality of first type conductors comprising a mating end, a mounting end opposite the mating end, and an intermediate portion joining the mating end and the mounting end, the mating end comprising a mating contact portion curving into a first portion of the two or more portions of the slot; and a plurality of second type conductors, each of the plurality of second type conductors comprising a mating end, a mounting end opposite the mating end, and an intermediate portion joining the mating end and the mounting end, the mating end comprising a plurality of mating contact portions curving into a second portion of the two or more portions of the slot.

In some embodiments, the plurality of first type conductors may be configured for transmitting signals, and the plurality of second type conductors may be configured for transmitting power.

In some embodiments, the card edge connector may include a plurality of ribs extending in a vertical direction perpendicular to the longitudinal direction on outside surfaces of the first and second walls corresponding to the first portion of the two or more portions of the slot; and a plurality of openings through the first and second walls corresponding to the second portion of the two or more portions of the slot.

In some embodiments, the mounting contact portions of the plurality of first type conductors may be configured to mount to a surface of a printed circuit board, and the mounting contact portions of the plurality of second type conductors may be configured to insert into holes of the printed circuit board.

In some embodiments, the mounting contact portions of the plurality of first type conductors may be configured to have a first pitch, the mounting contact portions of the plurality of second type conductors may be configured to have a second pitch, and the first pitch may be smaller than the second pitch.

In some embodiments, the first pitch may have a value between 0.60 mm and 0.70 mm.

In some embodiments, the housing may have a width in a transverse direction perpendicular to the longitudinal direction, the plurality of first type conductors may be disposed in first and second rows along the first and second walls, respectively, and distal ends of the mounting ends of the first type conductors in the first row may be separated from distal ends of the mounting ends of the first type conductors in the second row by a distance in the transverse direction that may be less than the width of the housing.

In some embodiments, the first type conductors in the first row may be offset with respect to the first type conductors in the second row in the longitudinal direction.

In some embodiments, the housing may include a mounting surface, and first and second posts extending from the mounting surface and spaced away from each other, the first and second posts having cross-sections of different shapes; and the mounting ends may extend out of the housing through the mounting surface.

Some embodiments relate to a card edge connector. The card edge connector may include a housing comprising first and second walls extending in a longitudinal direction and separated from each other by a slot, each of the first and second walls comprising a plurality of first type grooves and a plurality of second type grooves; a plurality of first type conductors disposed in the plurality of first type grooves and each comprising a mating contact portion curving into the slot and a mounting contact portion extending out of the housing, wherein each of the plurality of first type grooves comprises a tapered portion configured to hold the mating contact portion of a respective first type conductor; and a plurality of second type conductors disposed in the plurality of second type grooves and each comprising a plurality of mating contact portions curving into the slot and a plurality of mounting contact portions extending out of the housing.

In some embodiments, the plurality of first type grooves may each have a width in the longitudinal direction that reduces in a transverse direction perpendicular to the longitudinal direction.

In some embodiments, the plurality of second type grooves may each have a width in the longitudinal direction that may be greater than the width of each of the plurality of first type grooves in the longitudinal direction.

In some embodiments, each of the plurality of first type conductor may include a mating end comprising a first portion extending towards the slot, a second portion extending away from the slot, and the mating contact portion joining the first portion and the second portion.

In some embodiments, each of the plurality of second type conductor may include a mating end comprising the plurality of mating contact portions, a mounting end comprising the plurality of mounting contact portions, and a base between the mating end and the mounting end and configured to mount to one of the plurality of second type grooves.

In some embodiments, each of the plurality of second type conductor may have a first number of mating contact portions and a second number of mounting contact portions, and the first number may be greater than the second number.

Some embodiments relate to a card edge connector. The card edge connector may include a housing comprising first and second walls extending in a longitudinal direction and separated from each other by a slot; a plurality of mating contact portions curving into the slot; and a plurality of mounting contact portions extending out of the housing, the plurality of mounting contact portions comprising a first plurality of mounting contact portions having a first pitch and a second plurality of mounting contact portions having a second pitch, wherein the first pitch may be smaller than the second pitch, wherein the first plurality of mounting contact portions may be configured to mount to a surface of a printed circuit board, and the second plurality of mounting contact portions may be configured to insert into holes of the printed circuit board.

In some embodiments, the first pitch may have a value between 0.60 mm and 0.70 mm.

In some embodiments, the plurality of mating contact portions may comprise a first plurality of mating contact portions having a third pitch and a second plurality of mating contact portions having a fourth pitch, the third pitch may equal to the first pitch, and the fourth pitch may be smaller than the second pitch.

In some embodiments, the first plurality of mounting contact portions may each correspond to a respective one of the first plurality of mating contact portions.

In some embodiments, a first number of the second plurality of mounting contact portions may correspond to a second number of the second plurality of mating contact portions, and the second number may be greater than the first number.

Some embodiments relate to a hybrid card edge connector. The hybrid card edge connector may comprise an insulating housing having a mating surface and a mounting surface that are opposite to each other along a vertical direction. The mating surface may be provided with a slot for receiving a printed circuit board. The slot may include a signal slot and a power slot arranged along a longitudinal direction that is perpendicular to the vertical direction. The hybrid card edge connector may further comprise a plurality of signal conductors and a plurality of power conductors arranged in the insulating housing. The signal slot may expose signal mating contact portions of the plurality of signal conductors, and the power slot may expose power mating contact portions of the plurality of power conductors.

In some embodiments, a plurality of the signal slots may be arranged adjacently along the longitudinal direction.

In some embodiments, the slot may be arranged asymmetrically about a center line that runs along a transverse direction of the hybrid card edge connector, and the transverse direction is perpendicular to the longitudinal direction and the vertical direction.

In some embodiments, one or more strengthening rib(s) may be arranged on an outer side wall of a portion of the insulating housing provided with the signal slot.

In some embodiments, an outer flange that may be adjacent to the mating surface and extend along the signal slot may be arranged on the outer side wall of the portion, and a plurality of the strengthening ribs may extend from the outer flange in a direction away from the mating surface such that a recessed part may be formed between the adjacent strengthening ribs.

In some embodiments, the insulating housing may be provided with one or more heat dissipation hole(s) which may extend from the power slot to the outer side wall of the insulating housing.

In some embodiments, the plurality of signal conductors may be arranged in two columns that may be disposed on two sides of the signal slot, respectively, and one of the two columns may be offset relative to the other column along the longitudinal direction.

In some embodiments, the distance between the adjacent signal conductors may be less than 0.80 mm.

In some embodiments, each of the plurality of signal conductors may also include a signal mounting end, the signal mounting end and the signal mating contact portion are respectively disposed at two opposite ends of the signal conductor provided with the signal mounting end and the signal mating contact portion thereon, and the signal mounting end may extend beyond the mounting surface and be configured to be of a surface mounting type so as to be connected to the printed circuit board through a surface mounting technology.

In some embodiments, the signal mounting ends of the plurality of signal conductors may extend toward two sides of the insulating housing along a transverse direction that is perpendicular to the longitudinal direction and the vertical direction.

In some embodiments, the signal mounting ends of the plurality of signal conductors may be disposed on a same plane that is perpendicular to the vertical direction.

In some embodiments, the signal mounting ends of the plurality of signal conductors may be covered with the insulating housing, viewed along the vertical direction.

In some embodiments, each of the plurality of power conductors may further include a power mounting end, the power mounting end and the power mating contact portion may be respectively disposed on two opposite ends of the power conductor provided with the power mounting end and the power mating contact portion thereon, and the power mounting end may extend beyond the mounting surface of the insulating housing and be configured to be of a stacked package type so as to be connected to a printed circuit board through pin in paste.

In some embodiments, a positioning post may be disposed on and extend outward from the mounting surface, and the positioning post may be configured to be inserted into a printed circuit board to which the hybrid card edge connector is to be mounted.

In some embodiments, the positioning post may include a first positioning post and a second positioning post that may be spaced apart along the longitudinal direction of the hybrid card edge connector, the first positioning post may be disposed between adjacent signal slots, and the second positioning post may be disposed at the end of the hybrid card edge connector closer to the power slot.

In some embodiments, the first positioning post may have a cylindrical cross-section and the second positioning post has a cross-section of a different shape.

In some embodiments, a plurality of signal grooves may be disposed on two sides of the signal slot, the plurality of signal conductors may be mounted into the plurality of signal grooves, each of the plurality of signal grooves may include a portion adjacent to the mating surface, the portion may have an opening connected to the signal slot, each of the plurality of signal conductors may include an end provided with the signal mating contact portion thereon, and the end may be configured to move into the portion through the opening when pressed by the printed circuit board inserted into the slot.

In some embodiments, the portion may have a reduced width along a direction away from the opening.

In some embodiments, each of the plurality of signal conductors may include a signal mating end, a signal intermediate portion and a signal mounting end, the signal intermediate portion may join the signal mating end and the signal mounting end, the signal mating end may be provided with the signal mating contact portion, and a width of the signal mating end may be less than a width of the signal intermediate portion.

In some embodiments, the tip of the signal mating end may have a reduced width.

In some embodiments, the signal mating end may include a first portion, a third portion and a second portion, the first portion may obliquely extend towards the signal slot from the signal intermediate portion, the third portion may join the first portion and the second portion, the second portion may obliquely extend away from the signal slot from the third portion, and the signal mating contact portion may be arranged on the third portion.

In some embodiments, a thickness of the second portion may be less than that of the third portion and the first portion.

In some embodiments, the signal intermediate portion may include a fixed portion and a flexible portion, the fixed portion may be fixed in the insulating housing, the flexible portion may incline towards the signal slot relative to the fixed portion and be movable relative to the signal slot.

In some embodiments, the fixed portion may be provided with one or more protrusion(s) such that the fixed portion may form an interference fit with the insulating housing.

In some embodiments, the signal intermediate portion and the signal mating end may be connected through a transition portion that may bend away from the signal slot.

In some embodiments, the insulating housing may be provided with a plurality of power grooves that may be disposed on two sides of the power slot, the plurality of power conductors may be mounted into the plurality of power grooves, each of the plurality of power conductors may include a mounting base, a plurality of power mating ends and a power mounting end, the mounting base may be held in the corresponding power groove, the plurality of power mating ends may extend towards the mating surface from the mounting base, each of the plurality of power mating ends may be provided with the power mating contact portion, and the power mounting end may extend out of the insulating housing from the mounting base.

In some embodiments, each of the plurality of power mating ends may include a linear portion, a curved portion and a beam, the linear portion may extend towards the mating surface from the mounting base, the curved portion may join the linear portion and the beam, and the beam may extend towards the mounting surface from the curved portion and may be provided with the power mating contact portion.

In some embodiments, the beam may include a third portion, a second portion and a first portion, the third portion may be connected to the curved portion, the third portion may obliquely extend towards the power slot relative to the linear portion from the curved portion, the second portion may be connected between the third portion and the first portion, the first portion may obliquely extend away from the power slot relative to the linear portion from the second portion, and the power mating contact portion may be arranged on the second portion.

In some embodiments, an engaging portion may be disposed in a side surface of each of the plurality of power grooves, and a side surface of the mounting base of the corresponding power conductor may be provided with a snap that is fitted into the engaging portion.

In some embodiments, a cross section of the snap vertical to the longitudinal direction may be of a wedge shape that may have a reduced size along a direction facing the mounting surface, and the snap may be fitted into the engaging portion when each of the plurality of power conductors may be inserted into the corresponding power groove from the mating surface.

In some embodiments, a limiter may be arranged on each of the plurality of power conductors, a matching limiter may be arranged in the corresponding power groove, and the limiter and the matching limiter may abut against each other when the snap is fitted into the engaging portion in place.

In some embodiments, each of the power grooves may extend along the power slot, the engaging portion may be arranged in a side surface of a respective power groove extending along the power slot, and two ends of each of the plurality of power grooves may be provided with the matching limiters, respectively.

In some embodiments, each of the plurality of power conductors may further include a transition portion that may have an end connected to the mounting base and an opposite end connected to the power mating end, and the transition portion may bend away from the power slot from the mounting base and abut against the edge of the opening of the respective power groove.

In some embodiments, each of the plurality of power conductors may further include a plurality of power mounting ends that may be spaced apart along the longitudinal direction, and a snap may be arranged above each of the plurality of power mounting ends.

These techniques may be used alone or in any suitable combination. The foregoing summary is provided by way of illustration and is not intended to be limiting.

BRIEF DESCRIPTION OF DRAWINGS

The accompanying drawings are not intended to be drawn to scale. In the drawings, identical or nearly identical components that are illustrated in various figures may be represented by a like numeral. For purposes of clarity, not every component may be labeled in every drawing. In the drawings.

Figure 1:
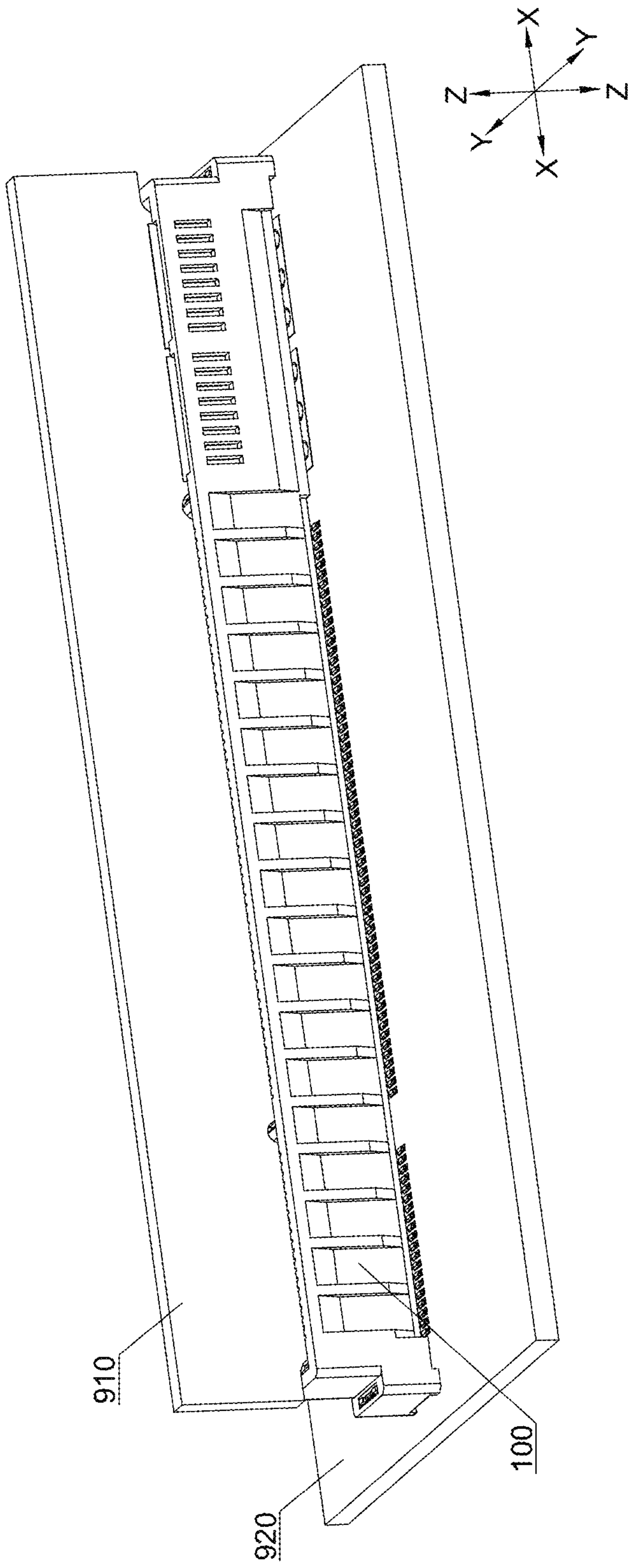
FIG. 1 is a perspective view of an electronic system, according to some embodiments.

The above accompanying drawings include the following reference signs:

hybrid card edge connector 100;
insulating housing 200;
mating surface 201;
mounting surface 202;
slot 203;
signal slot 210;
strengthening rib 211;
outer flange 212;
recessed part 213;
power slot 220;
heat dissipation hole 221;
positioning post 230;
first positioning post 231;
second positioning post 232;
signal groove 240;
portion 241;
opening 242;
power groove 250;
opening 2501;
engaging portion 251;
projecting platform 252;
first power groove 253;
second power groove 254;
first separating rib 260;
second separating rib 270;
signal conductor 300;
signal mating contact portion 310;
signal mounting end 320;
signal mating end 330;
first portion 331;
third portion 332;
second portion 333;
signal intermediate portion 340;
fixed portion 341;
flexible portion 342;
protrusion 343;
transition portion 350;
power conductor 400;
step 402;
power mating contact portion 410;
power mounting end 420;
mounting base 430;
snap 431;
power mating end 440;
linear portion 441;
curved portion 442;
beam 443;
third portion 444;
second portion 445;
first portion 446;
transition portion 450;
printed circuit board 910;
first contact pad 911;
second contact pad 912;
printed circuit board 920;
positioning hole 921;
contact pad 922;
hole 923.

DETAILED DESCRIPTION

The Inventors have recognized and appreciated connector design techniques that enable connectors capable of passing signal and power simultaneously. Conventionally, signal transmission and power transmission require separate connectors because of incompatible requirements between signal transmission and power transmission. Separate connectors, however, consume larger board area and require more processes to manufacture and assemble. The Inventors have recognized and appreciated connector housing design techniques that enable the connector housing to support multiple types of conductors such that the conductors may be placed closer to each other, sustain a similar amount of force generated when mating with a mating component such as an add-in card, and/or withstand different amounts of heat generated during operation. The connector housing may have features configured to prevent cross-talks among the same type of conductors and interferences between different types of conductors. The Inventors have also recognized and appreciated design techniques for the multiple and varied types of conductors such that the conductors may be mounted to a printed circuit board such as a backplane using a same process and can sustain a similar amount of force that may be generated when mating with the mating component. These techniques may be used alone or in any suitable combination.

An electrical connector may include a housing holding multiple types of conductors that may include a first type of conductors configured for transmitting signals and a second type of conductors configured for transmitting power. The housing may have first and second walls extending in a longitudinal direction and separated from each other by a slot configured to receive a mating component such as an add-in card.

The housing may have first type grooves for holding the signal conductors and second type grooves for holding the power conductors. The first type grooves may be disposed in first and second rows along the first and second walls, respectively. The first type grooves in the first row may be offset with respect to the first type grooves in the second row in the longitudinal direction such that the signal conductors held therein are offset correspondingly. Such a configuration may increase distances between the signal conductors in different rows and therefore reduce crosstalks therebetween and increase signal integrity for the connector. The second type grooves may also be disposed in the first and second rows along the first and second walls, respectively. The second type grooves in the first row may be aligned with the second type grooves in the second row in the longitudinal direction such that the power conductors held herein are aligned correspondingly. Such a configuration may ensure positive power conductor and negative power conductor to be disposed in desired positions with respect to each other.

The grooves may be configured according to the different requirements of the signal conductors and power conductors. Each first type groove may include a width in the longitudinal direction that reduces in a transverse direction perpendicular to the longitudinal direction. Such a configuration enables the signal conductors held therein to sustain a similar amount of force generated when mating with the mating component as the power conductors which may be configured wider and thicker for transmitting power. For example, the signal conductors that may be configured narrower and thinner may be moved away from the desired center positions under the mating force. The first type grooves with diminishing width may re-center these signal conductors.

The grooves may be disposed in the housing in a manner that may reduce interference between signal conductors and power conductors held therein. The housing may include ribs joining the first and second walls and separating the slot into two or more portions. The grooves that correspond to each portion of the slot may be the same type such that the conductors held therein are the same type.

The first and second walls may be configured according to the disposition of the grooves. Portions of the first and second walls that correspond to the first type grooves may have ribs extending in a vertical direction perpendicular to the longitudinal direction and on outside surfaces of the portions of the first and second walls. These ribs may provide additional mechanical strength to the portions of the connector configured for transmitting signals. Portions of the first and second walls that correspond to the second type grooves may have holes extending therethrough so as to facilitate the dissipation of the larger amount of heat generated by the power conductors.

The signal conductors and power conductors may be configured such that they may be mounted to a printed circuit board simultaneously using a same process and sustain a similar amount of force when mating with the mating component. Each conductor may have a mating end comprising one or more mating contact portions curving into the slot so as to make contact with respective contact pads of a printed circuit board inserted therein, a mounting end opposite the mating end and extending out of the housing so as to mount to another printed circuit board, and an intermediate portion joining the mating end and the mounting end. The mounting ends may be configured to hide under the housing such that they are invisible when looking into the slot from the top of the connector in the vertical direction. Such a configuration may prevent the mounting ends from accidentally touching each other and also enable easy automated optical inspection (AOI).

For each signal conductor, the mounting end may be configured to surface mount to the printed circuit board. For each power conductor, the mounting end may be configured to insert into holes of the printed circuit board, which may enable the power conductor to deliver large current and provide additional retention force for holding the power conductor to the printed circuit board. Such a configuration may enable the mounting ends of the signal conductors and power conductors to be mounted to the printed circuit board using a same process such as welding and/or soldering and reflow.

For each signal conductor, the mating end may have a mating contact portion extending from a respective intermediate portion. For each power conductor, the mating end may have multiple mating contact portions extending from a shared intermediate portion. Such a configuration may enable the mating ends of the signal conductors and power conductors to deflect a similar degree by the inserted printed circuit board and therefore prevent damaging signal conductors during operation.

FIG. 1 to FIG. 10 are an example of techniques as described herein integrated into a hybrid card edge connector. The hybrid card edge connector may include an insulating housing 200 elongating in a longitudinal direction X-X, a plurality of signal conductors 300 and a plurality of power conductors 400. For clear and concise description, a vertical direction Z-Z, the longitudinal direction X-X and a transverse direction Y-Y are defined. The vertical direction Z-Z, the longitudinal direction X-X and the transverse direction Y-Y may be perpendicular to one another. The vertical direction Z-Z may refer to a height direction of the hybrid card edge connector 100. The longitudinal direction X-X may refer to a length direction of the hybrid card edge connector 100. The transverse direction Y-Y may refer to a width direction of the hybrid card edge connector 100.

The insulating housing 200 may be provided with a mating surface 201 and a mounting surface 202 which are opposite to each other along the vertical direction Z-Z. The mating surface 201 may be provided with a slot 203. The slot 203 may be recessed inwards along the vertical direction Z-Z. The slot 203 may be used to receive a printed circuit board 910.

The slot 203 may have a longitudinal strip shape in the longitudinal direction X-X. The mounting surface 202 may face an element, such as a printed circuit board. Specifically, the printed circuit board 910 may be inserted towards the mating surface 201 and into the slot 203, and the mounting surface 202 may face a printed circuit board 920 serving as a backplane, such that the printed circuit board 910 is electrically connected to the printed circuit board 920 through the hybrid card edge connector 100 and a circuit on the printed circuit board 910 and a circuit on the printed circuit board 920 are interconnected.

The signal conductors 300 and the power conductors 400 may be arranged on the insulating housing 200 through welding and/or soldering, adhesion, insertion or any suitable manners. The signal conductors 300 and the power conductors 400 may be spaced apart. In other words, the signal conductors 300 and the power conductors 400 may be disposed at different areas on the insulating housing 200.

The slot 203 may include a signal slot 210 and a power slot 220. The signal slot 210 and the power slot 220 may be arranged along the longitudinal direction X-X. The arrangement of the signal slot 210 and the power slot 220 is not limited. When a plurality of signal slots 210 or a plurality of power slots 220 are provided, the same type of slots may be arranged adjacently, or may also be arranged alternately with other type of a slot(s). In the embodiments shown in the figures, the insulating housing 200 may be provided with a first separating rib 260. The first separating rib 260 may be disposed between the signal slot 210 and the power slot 220, for separating the signal slot 210 and the power slot 220. In other embodiments not shown in the figure, the slot 203 may also include two slots which are not communicated with each other so as to form the signal slot 210 and the power slot 220.

Each signal conductor 300 may be provided with a signal mating contact portion 310. The signal mating contact portion 310 may be used to make contact with the printed circuit board 910, such that the printed circuit board 910 is electrically connected to the printed circuit board 920, and signals may be transmitted. Each power conductor 400 may be provided with one or more power mating contact portions 410. The power mating contact portion 410 may be used to make contact with the printed circuit board 910, such that the printed circuit board 910 is electrically connected to the printed circuit board 920, and the printed circuit board 920 may supply power to the printed circuit board 910.

Figure 2:
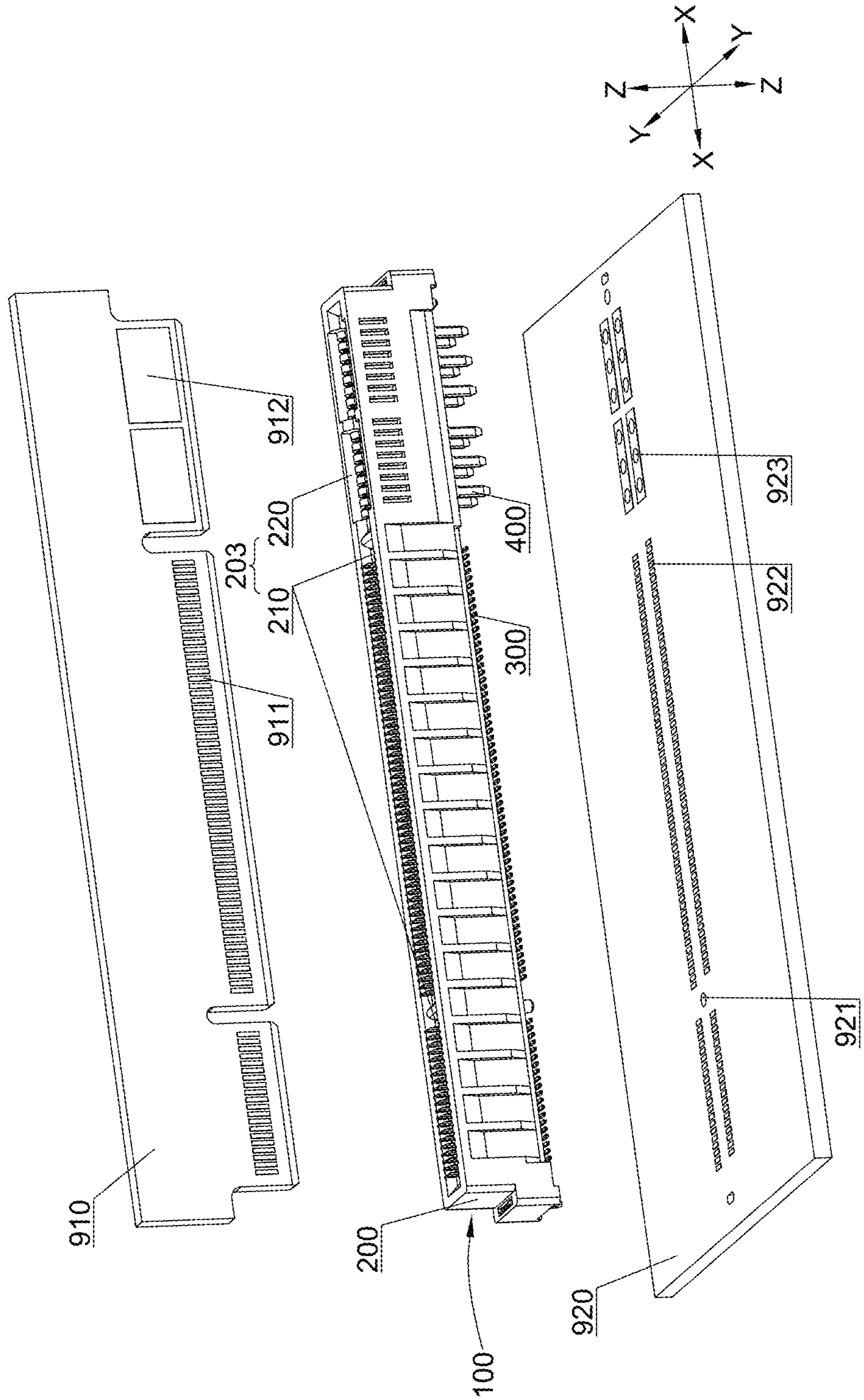
FIG. 2 is an exploded perspective view of the electronic system of FIG. 1.

The signal slot 210 may expose the signal mating contact portions 310 of signal conductors 300. The power slot 220 may expose the power mating contact portions 410 of power conductors 400. The plurality of signal conductors 300 may be disposed on two sides of the signal slot 210. The plurality of power conductors 400 may be disposed on two sides of the power slot 220. It may be understood that first contact pads 911 and second contact pads 912 may be disposed along an edge of the printed circuit board 910, as shown in FIG. 2. The first contact pads 911 may be inserted into the signal slot 210. The second contact pads 912 may be inserted into the power slot 220. In this way, after the printed circuit board 910 is inserted into the slot 203, the first contact pads 911 may be electrically coupled with the signal mating contact portions 310 for transmitting signals. The second contact pad 912 may be electrically coupled with the power mating contact portions 410 for transmitting power. Therefore, the signals and the power may be separated, such that mutual interference between the signals and power can be reduced and the hybrid card edge connector 100 may have good performance.

In the hybrid card edge connector 100 according to the embodiments of the present disclosure, the signal slot 210 and the power slot 220 are arranged on the insulating housing 200 along the longitudinal direction, such that the plurality of signal conductors 300 and the plurality of power conductors 400 may be spaced apart. Therefore, the hybrid card edge connector 100 may transmit signals and supply power for the printed circuit board 910 inserted therein at the same time, and the mutual interference between the signals and power is smaller. Therefore, the hybrid card edge connector 100 is multifunctional and has higher practicability. Based on this, the electronic system may use fewer types of the electrical connectors, the structure of the electronic system is simpler, the assembly steps are reduced, and the production time is shortened. Therefore, the production efficiency and yield of the electronic system can be effectively improved.

Figure 6:
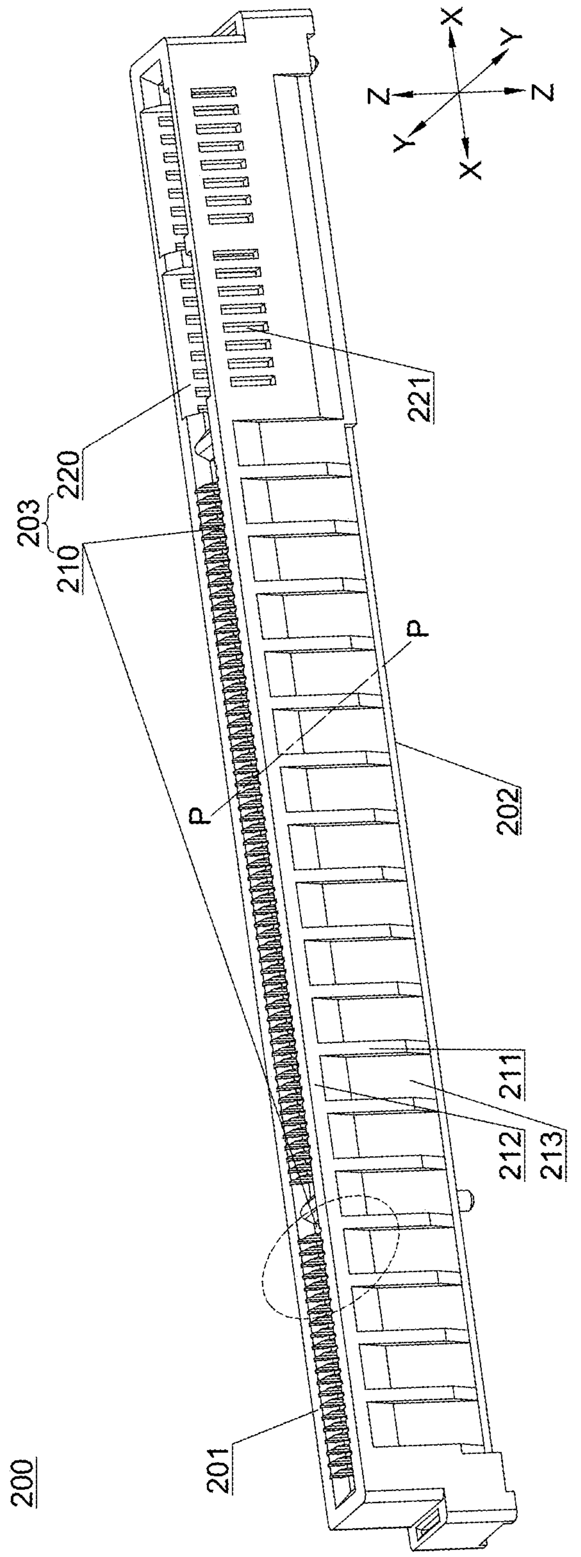
FIG. 6 is a top, side perspective view of a housing shown in FIG. 3.

In some embodiments, the arrangement of the signal slot 210 and the power slot 220 on the insulating housing 200 may be asymmetrical about a center line P-P (as shown in FIG. 6) which extends along the transverse direction Y-Y of the hybrid card edge connector 100. For example, the signal slot 210 may be arranged close to one longitudinal end of the insulating housing 200, and the power slot 220 may be arranged close to another longitudinal end of the insulating housing 200, as shown in the figures. The insulating housing 200 is provided with two signal slots 210 which are arranged adjacently and close to the left end of the insulating housing 200. The power slot 220 is arranged close to the right end of the insulating housing 200. Optionally, the signal slot 210 and the power slot 220 may also be arranged alternately. The hybrid card edge connector 100 may have fool-proof features, thereby avoiding wrong insertion. For example, a structure of the signal slot 210 and the signal conductors 300 on two sides thereof have different structures from the power slot 220 and the power conductors 400 on two sides thereof, which includes, but not limited to, one or more of the followings: different sizes of the signal slot 210 and the power slot 220 along the longitudinal direction X-X, different sizes of them along the transverse direction Y-Y, different shapes of them, and different structures and numbers of the signal conductors 300 and the power conductors 400.

Further, as shown in FIG. 2, the number of the signal slots 210 may be multiple, including but not limited to two shown in the figures. The plurality of signal slots 210 may be arranged adjacently along the longitudinal direction X-X. The plurality of signal slots 210 may be the same or different. When the signal conductors 300 are used to transmit different types of signals, the signal conductors 300 for transmitting different signals may be disposed at different signal slots 210. In this way, mutual interference of the signals may be reduced, and the signal integrity may be ensured. Optionally, the plurality of signal conductors 300 may be arranged on two sides of different signal slots 210 according to different types of the signal conductors 300. For example, high-frequency signal conductors may be arranged on two sides of the same signal slot, and low-frequency signal conductors may be arranged on two sides of another signal slot.

Figure 5:
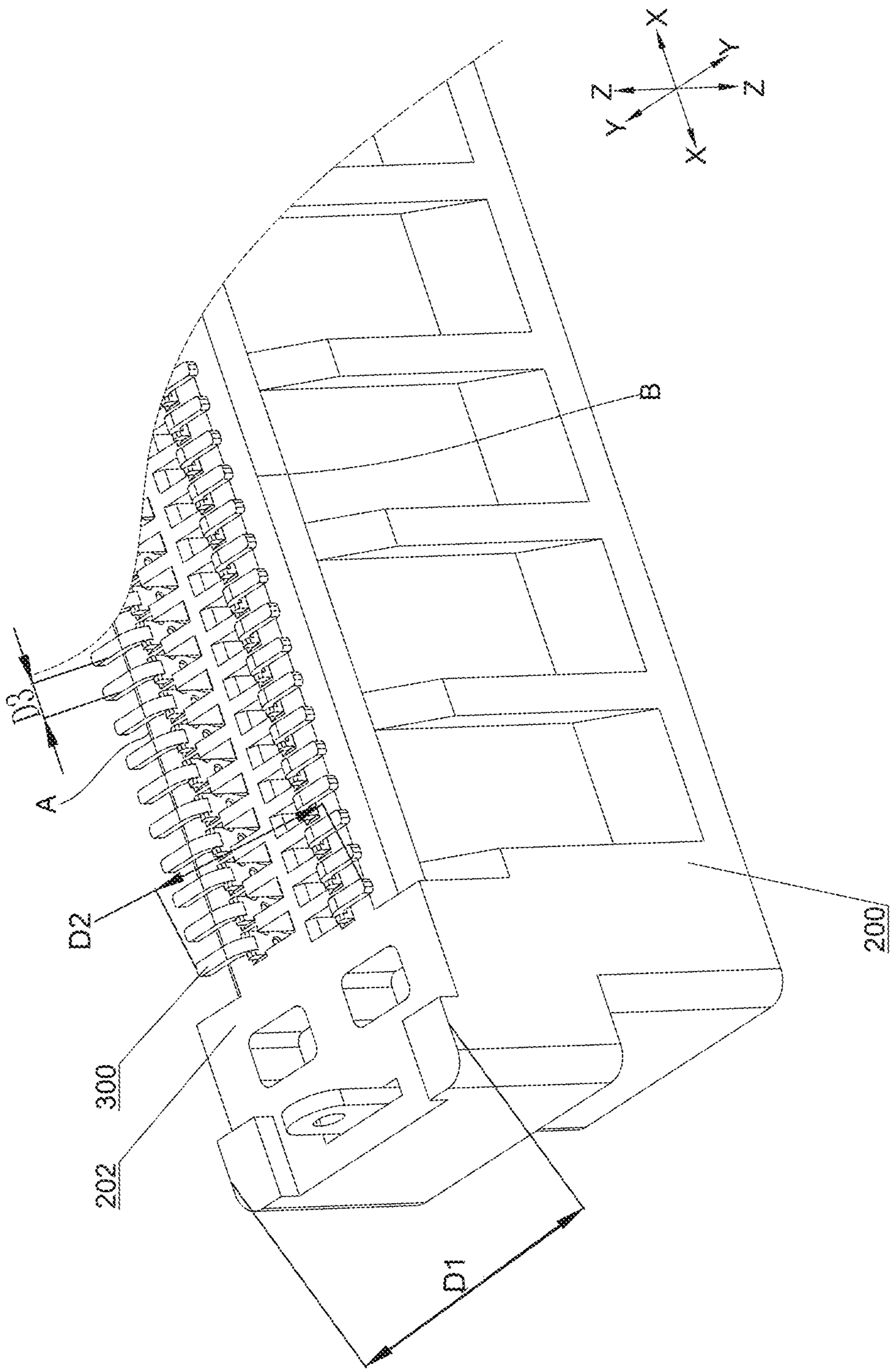
FIG. 5 is an enlarged perspective view of a portion of the hybrid card edge connector of FIG. 4.

A distance D3 (as shown in FIG. 5) between adjacent signal conductors 300 may be configured smaller and therefore increase the density of the signal conductors 300 and improve signal transmission efficiency. The distance D3 between the adjacent signal conductors 300 may be less than 0.80 mm including, for example, between 0.60 mm and 0.70 mm. In some embodiments, the distance D3 between the adjacent signal conductors 300 may be 0.65 mm. Through this arrangement, the size of the hybrid card edge connector 100 may be reduced, providing a possibility for minimization of the electronic system. In a case that the number of the signal conductors 300 is increased, the signal slot 210 may be configured to have a sufficient longitudinal length. If only a single signal slot 210 is provided, the walls of the insulating housings 200 on two sides of the signal slot 210 may become thinner, resulting in a reduced mechanical strength. It is likely to crack after a long time of use. Through the arrangement of a plurality of signal slots 210, the cracking problem can be significantly improved. The adjacent signal slots 210 may be separated by a second separating rib 270.

In some embodiments, as shown in FIG. 6, one or more strengthening rib(s) 211 may be arranged on an outer side wall of a portion of the insulating housing 200 provided with the signal slot 210. For the clarity of the following description, the portion of the insulating housing 200 provided with the signal slot 210 is referred to as a first portion of the insulating housing 200, and a portion of the insulating housing 200 provided with the power slot 220 is referred to as a second portion of the insulating housing 200. The shape and number of the strengthening rib(s) 211 are not limited.

Through the arrangement of the strengthening rib(s) 211, the mechanical strength of the first portion of the insulating housing 200 where the signal slot 210 is disposed can be enhanced, avoiding the influence on the electrical coupling between the signal contacts on the signal conductors 300 and the printed circuit board 910 because of the damage of the signal slot 210. As mentioned above, the signal slot 210 may have a strip shape extending along the longitudinal direction X-X, the side wall extending along the longitudinal direction X-X may be more susceptible to damage. The strengthening rib(s) 211 arranged on the first portion of the insulating housing 200 may enable the insulating housing 200 to be mechanically stronger.

Further, as shown in FIG. 6, an outer flange 212 extending along the signal slot 210 may be arranged on an outer side wall of the signal slot 210. The outer flange 212 may be adjacent to the mating surface 201. The outer flange 212 may be arranged adjacent to an opening of the signal slot 210 and extend continuously along the opening. In some embodiments, the outer flange 212 may run along the signal slots 210. The outer flange 212 may play a reinforcing role at the opening of the signal slot 210, of which the mechanical strength is the worst relative to other portions. There may be a plurality of strengthening ribs 211. The plurality of strengthening ribs 211 may extend from the outer flange 212 in a direction away from the mating surface 201 (that is, a direction towards the mounting surface 202). The strengthening ribs 211 may extend along the vertical direction Z-Z as shown in the figure. In other embodiments not shown in the figure, the strengthening ribs 211 may be inclined relative to the vertical direction Z-Z. Furthermore, the strengthening ribs 211 may be either linear or curved. A recessed part 213 may be formed between the adjacent strengthening ribs 211. The plurality of strengthening ribs 211 may be connected mutually through the outer flange 212, which may enable the insulating housing 200 to be mechanically stronger. The insulating housing 200 may be manufactured by an integrated molding process. The recessed part 213 may be arranged between the adjacent strengthening ribs 211, such that the consumption of the raw materials for manufacturing the insulating housing 200 can be reduced, and it is beneficial to reduce cost. In addition, the wall of the signal slot 210 at the recessed part 213 is thinner, which may facilitate heat dissipation of the signal conductor 300. A transverse size of the portion of the insulating housing 200 where the strengthening rib 211 is disposed may be equivalent to a transverse size of the second portion of the insulating housing 200 provided with the power slot 220, such that the insulating housing 200 may have more compact structure, as well as mechanically stronger.

In some embodiments, as shown in FIG. 6, the insulating housing 200 may be provided with a heat dissipation hole(s) 221. The heat dissipation hole(s) 221 may be disposed on the side wall of the power slot 220. The heat dissipation hole(s) 221 may extend from the power slot 220 to the outer side wall of the insulating housing 200. The shape and number of the heat dissipation hole(s) 221 are not limited. When the hybrid card edge connector 100 is in use, the current is transmitted by the power conductor 400 and heat can be generated. Through the arrangement of the heat dissipation hole(s) 221, the temperature in the power slot 220 can be reduced, thereby avoiding damage of the printed circuit board 910 and/or the insulating housing 200 due to an excessively high temperature.

Figure 4:
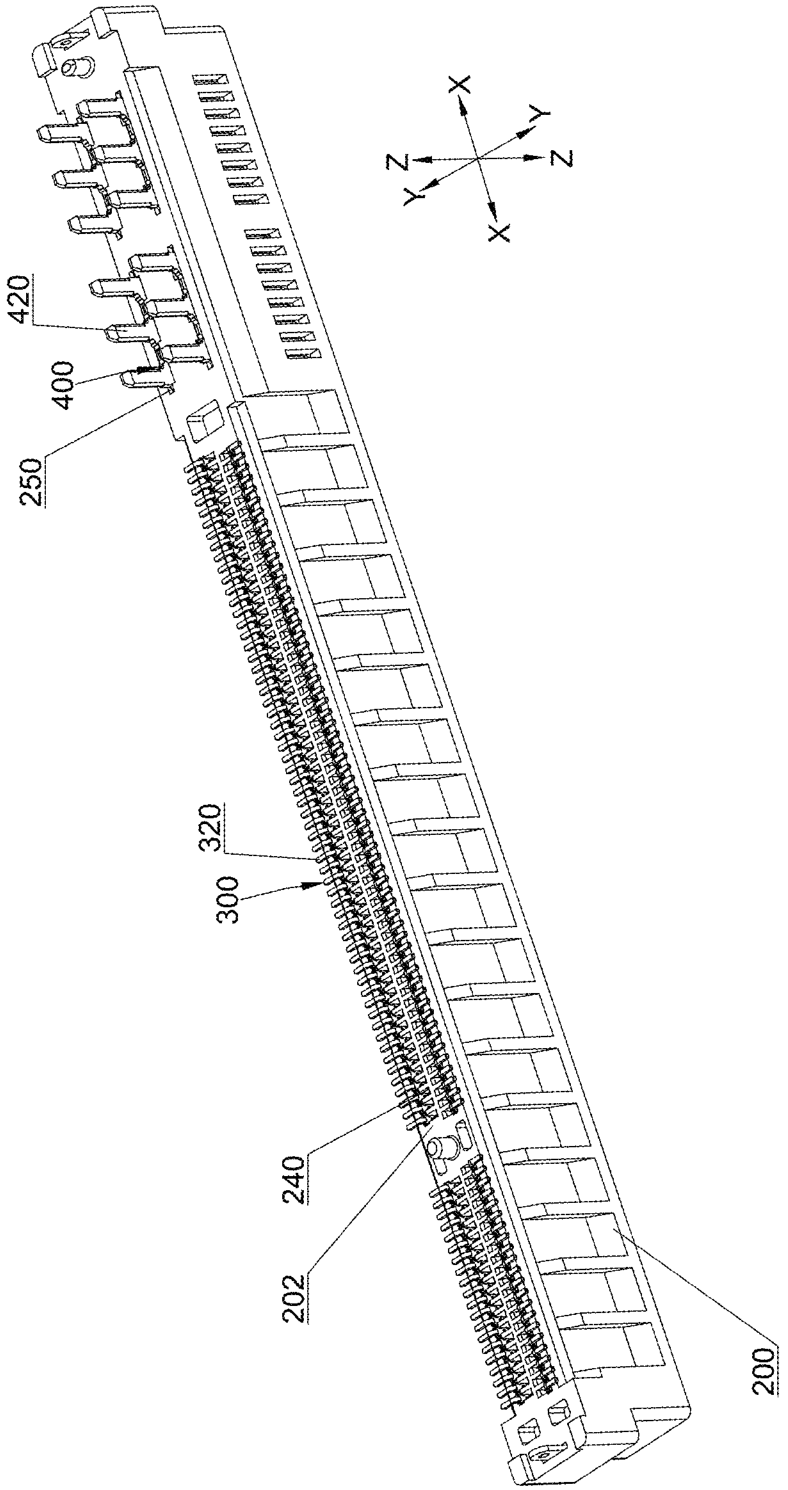
FIG. 4 is a perspective view of the hybrid card edge connector shown in FIG. 2.

In some embodiments, as shown in FIG. 4 and FIG. 5, the plurality of signal conductors 300 may be arranged in two columns. The two columns may be disposed on two sides of the signal slot 210 respectively (that is, sides A and B shown in the figures). One of the two columns may offset relative to the other column along the longitudinal direction X-X of the hybrid card edge connector 100. Through this arrangement, a distance between signal conductors 300 in the two columns can be increased, such that crosstalk can be reduced, and the signal integrity can be improved.

Figure 8:
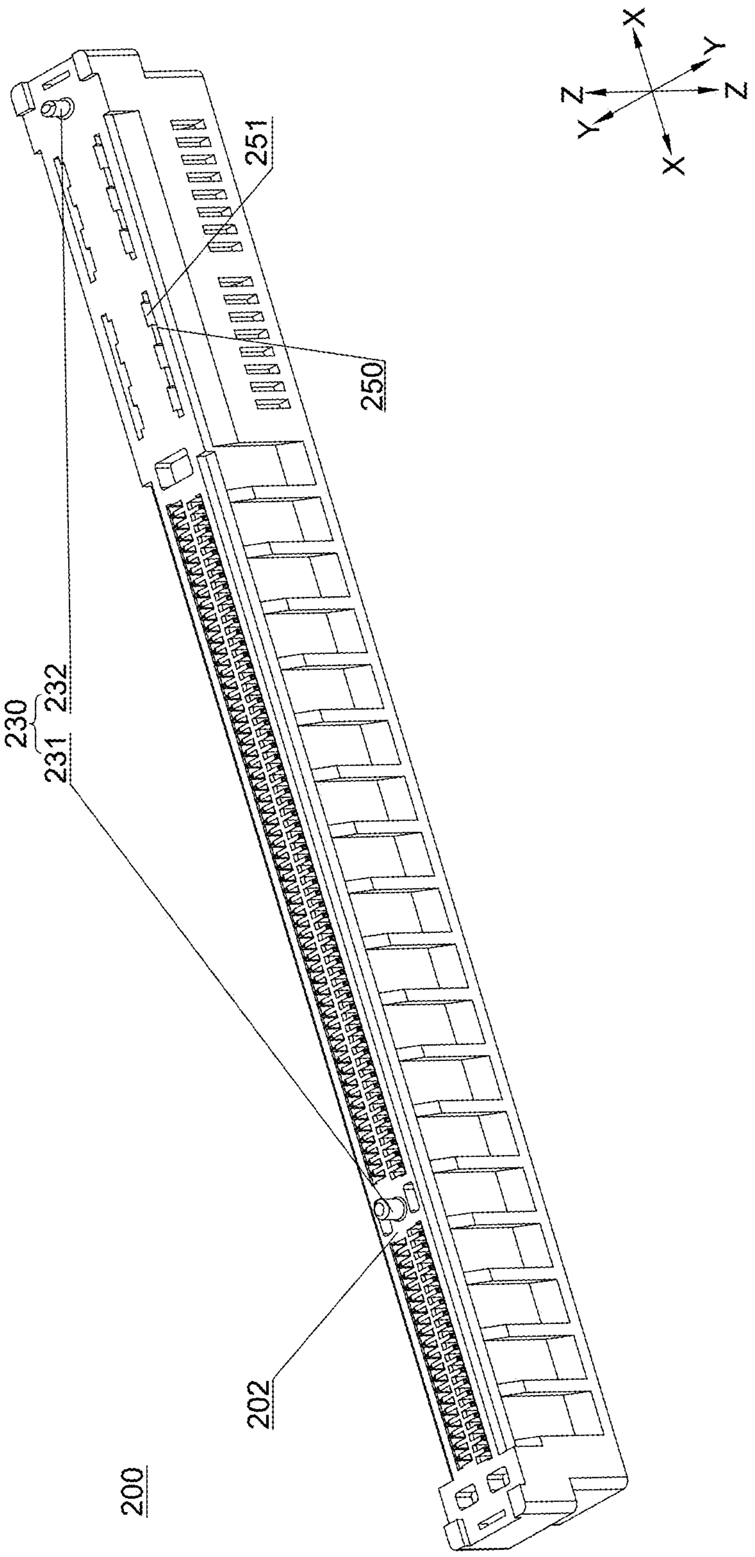
FIG. 8 is a bottom, side perspective view of the housing shown in FIG. 3.

In some embodiments, as shown in FIG. 2 and FIG. 8, a positioning post 230 may be arranged on the mounting surface 202 of the insulating housing 200. The positioning post 230 may extend outward from the mounting surface 202. The positioning post 230 may be inserted into a printed circuit board 920 on which the hybrid card edge connector 100 is to be fixed. Exemplarily, the printed circuit board 920 may be provided with a positioning hole 921. The positioning post 230 may be inserted into the positioning hole 921. Through the arrangement of the positioning post 230, the connection strength between the hybrid card edge connector 100 and the printed circuit board 920 can be improved. Furthermore, the positioning post 230 may play a positioning role to ensure that the position of the hybrid card edge connector 100 relative to the printed circuit board 920 fixed, such that batch-to-batch consistency is high.

As shown in FIG. 8, the positioning post 230 may include a first positioning post 231 and a second positioning post 232. The first positioning post 231 and the second positioning post 232 may be the same or different. The first positioning post 231 and the second positioning post 232 may be spaced apart along the longitudinal direction X-X of the hybrid card edge connector 100. Along the longitudinal direction X-X, the first positioning post 231 may be disposed in the middle of the hybrid card edge connector 100. The first positioning post 231 may be disposed between the adjacent signal slots 210. The second positioning post 232 may be disposed at an end of the hybrid card edge connector 100. For example, the second positioning post 232 may be disposed at the end close to the power slot 220. Such a configuration may provide fool-proof, avoiding an erroneous connection between the hybrid card edge connector 100 and the printed circuit board 920. Meanwhile, the first positioning post 231 and the second positioning post 232 may further improve the connection strength between the hybrid card edge connector 100 and the printed circuit board 920.

As shown in FIG. 8, the first positioning post 231 and the second positioning post 232 may have different shapes, which may prevent the connector to be mounted in a wrong direction. For example, the first positioning post 231 may be cylindrical. The second positioning post 232 may be non-cylindrical.

In some embodiments, as shown in FIG. 2 and FIG. 4, each of the plurality of signal conductors 300 may include a signal mounting end 320. The signal mounting end 320 and the signal mating contact portion 310 may be respectively disposed at two opposite ends of the signal conductor 300 where the signal mounting end 320 and the signal mating contact portion 310 are disposed. The signal mounting end 320 may extend beyond the mounting surface 202. The signal mounting end 320 may be configured to be of a surface mounting type. For example, the printed circuit board 920 may be provided with contact pads 922. The signal mounting ends 320 may be welded and/or soldered to contact pads 922.

Through this arrangement, the electronic system using the hybrid card edge connector 100 may have many advantages, such as higher assembling density, smaller volume, lighter weight, higher reliability, higher vibration resistance, lower defect rate of welding and/or soldering, well high-frequency characteristic, increased automation, improved production efficiency and the like.

In some embodiments, as shown in FIG. 4 to FIG. 5, along the transverse direction Y-Y of the hybrid card edge connector 100, the signal mounting ends 320 may extend towards two sides of the insulating housing 200. Such a configuration may facilitate subsequent automatic optical inspection (AOI) on the signal mounting ends 320. Optionally, the signal mounting ends 320 may extend out of the insulating housing 200, or may not extend out of the insulating housing 200.

In some embodiments, as shown in FIG. 4 to FIG. 5, viewed along the vertical direction Z-Z of the hybrid card edge connector 100, the signal mounting ends 320 may be covered with the insulating housing 200. That is, a transverse size D1 of the insulating housing 200 may be greater than a maximum transverse distance D2 of the signal mounting ends 320. In this way, the insulating housing 200 may play a certain role in protecting the signal mounting ends 320, thereby preventing the signal mounting ends 320 from being damaged by an external force.

In some embodiments, as shown in FIG. 4 to FIG. 5, the signal mounting ends 320 of the plurality of signal conductors 300 may be disposed on a same plane. The same plane may be vertical to the vertical direction Z-Z of the hybrid card edge connector 100. That is, the same plane may be parallel with the longitudinal direction X-X and the transverse direction Y-Y. Once a signal mounting end 320 is protruded, the protruded signal mounting end 320 may shift because of interference in the welding and/or soldering process, resulting in loose welding and/or soldering, misaligned welding and/or soldering and the like. Therefore, the signal mounting ends 320 of the plurality of signal conductors 300 on a same plane can increase the welding and/or soldering accuracy and the yield of the hybrid card edge connector.

Figure 12B:
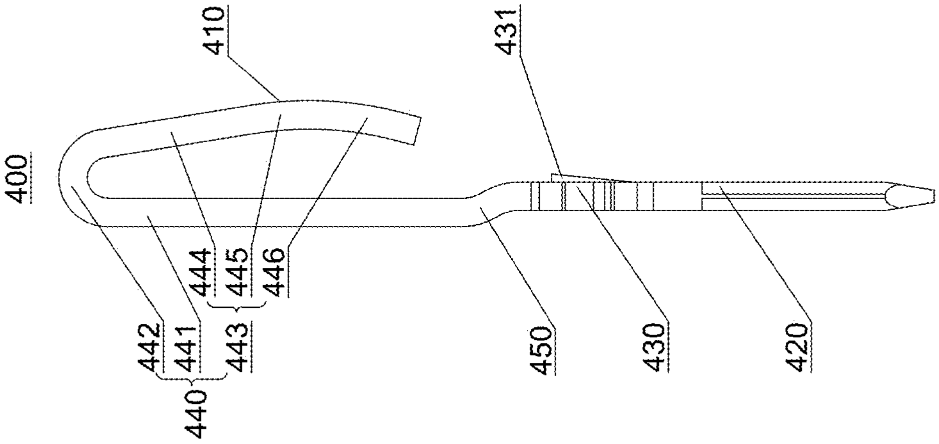
FIG. 12B is a side view of the power conductor of FIG. 12A.
Figure 12A:
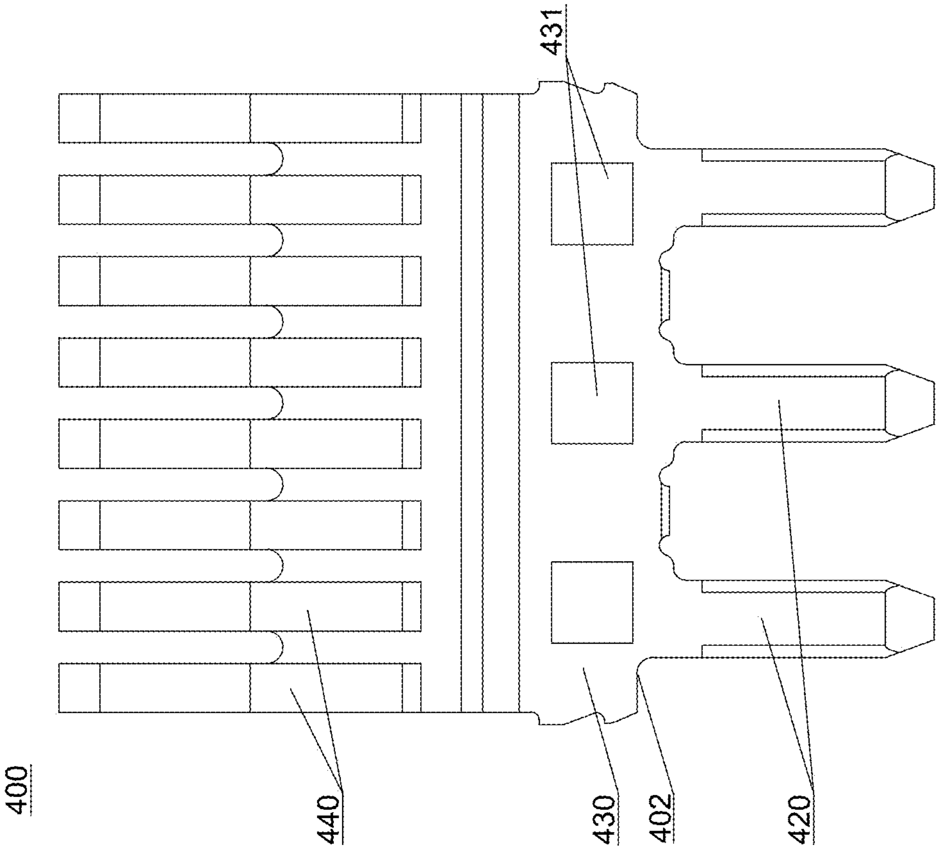
FIG. 12A is a front perspective view of a power conductor shown in FIG. 3.
Figure 13:
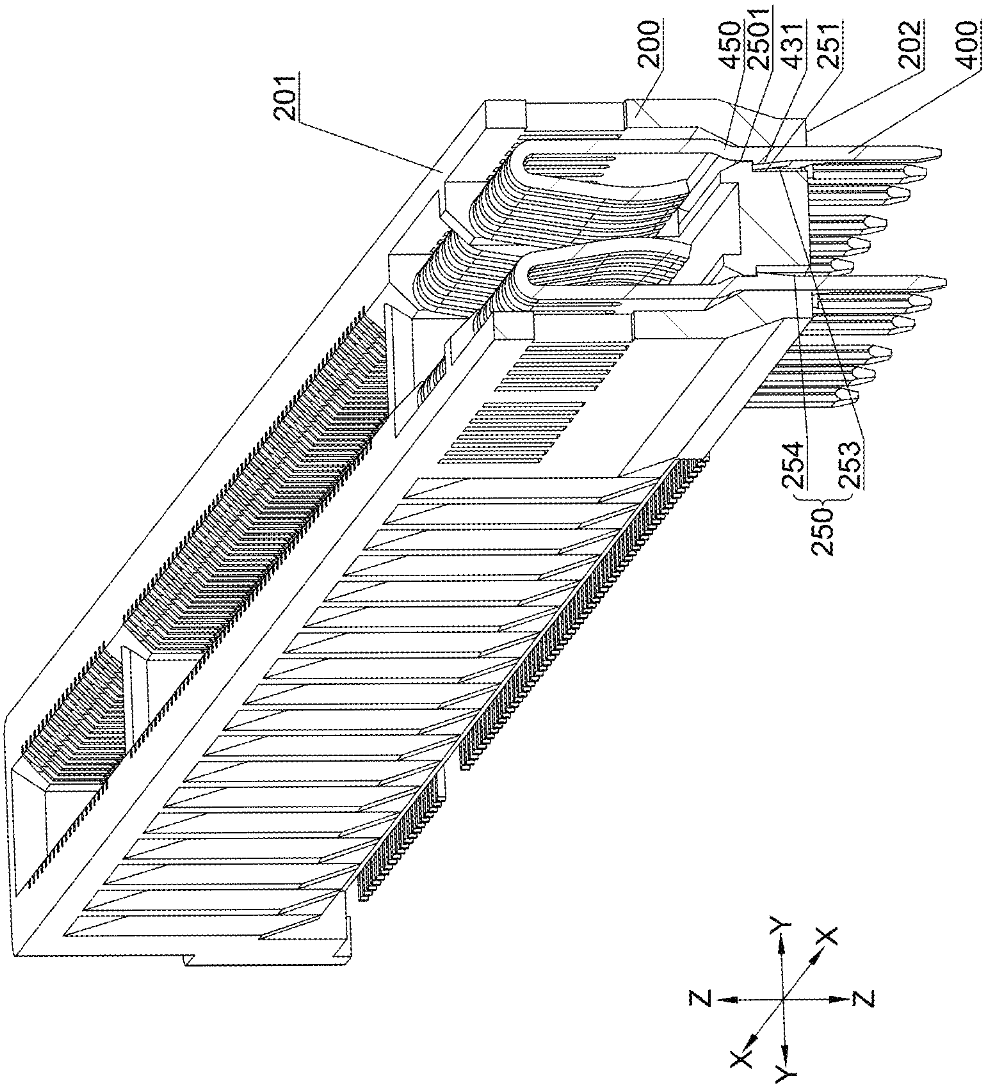
FIG. 13 is a cross-sectional perspective view of the hybrid card edge connector shown in FIG. 2.

In some embodiments, as shown in FIGS. 12A-12B and FIG. 13, the power conductor 400 may further include a power mounting end 420. The power mounting end 420 and the power mating contact portion 410 may be respectively disposed on two opposite ends of the power conductor 400 provided with the power mounting end 420 and the power mating contact portion 410 thereon. The power mounting end 420 may extend beyond the mounting surface 202 of the insulating housing 200. The power mounting end 420 may be configured to be of a pin in paste (PIP). For example, the printed circuit board 920 may be provided with a hole 923. The inventors have recognized and appreciated that such a configuration enables the power mounting ends 420 to be welded to the hole 923 using a same process used to weld the signal mounting ends to the contact pads 922.

Through this arrangement, the electronic system using the hybrid card edge connector 100 may have many advantages, such as lower production cost, higher production efficiency, capacity for transmitting larger current and the like. Furthermore, this structure may also improve the connection strength between the hybrid card edge connector 100 and the printed circuit board 920.

Figure 7:
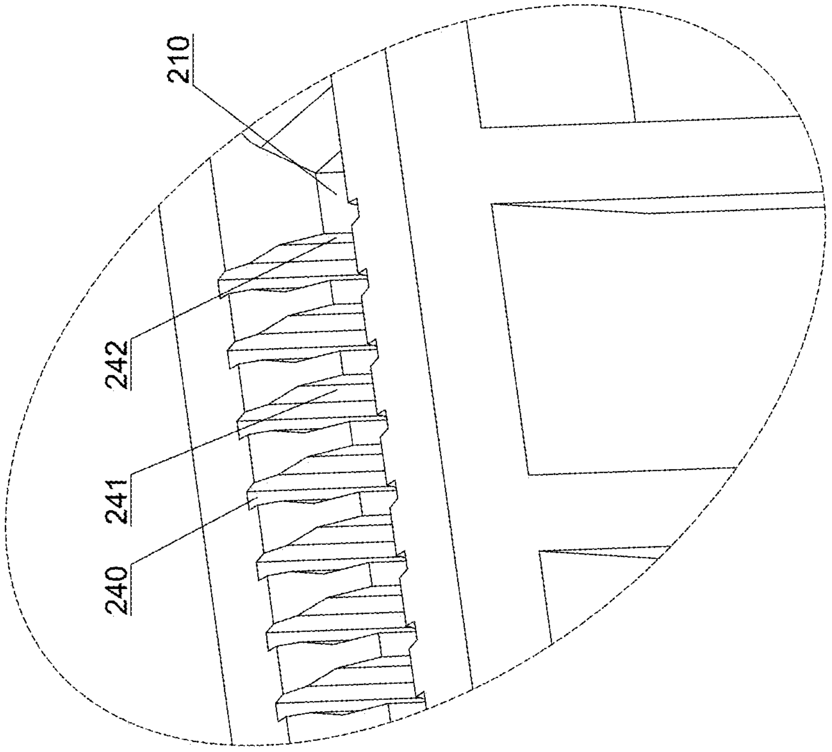
FIG. 7 is an enlarged perspective view of a portion of the housing circled in FIG. 6.
Figures 11A, 11B, 11C:
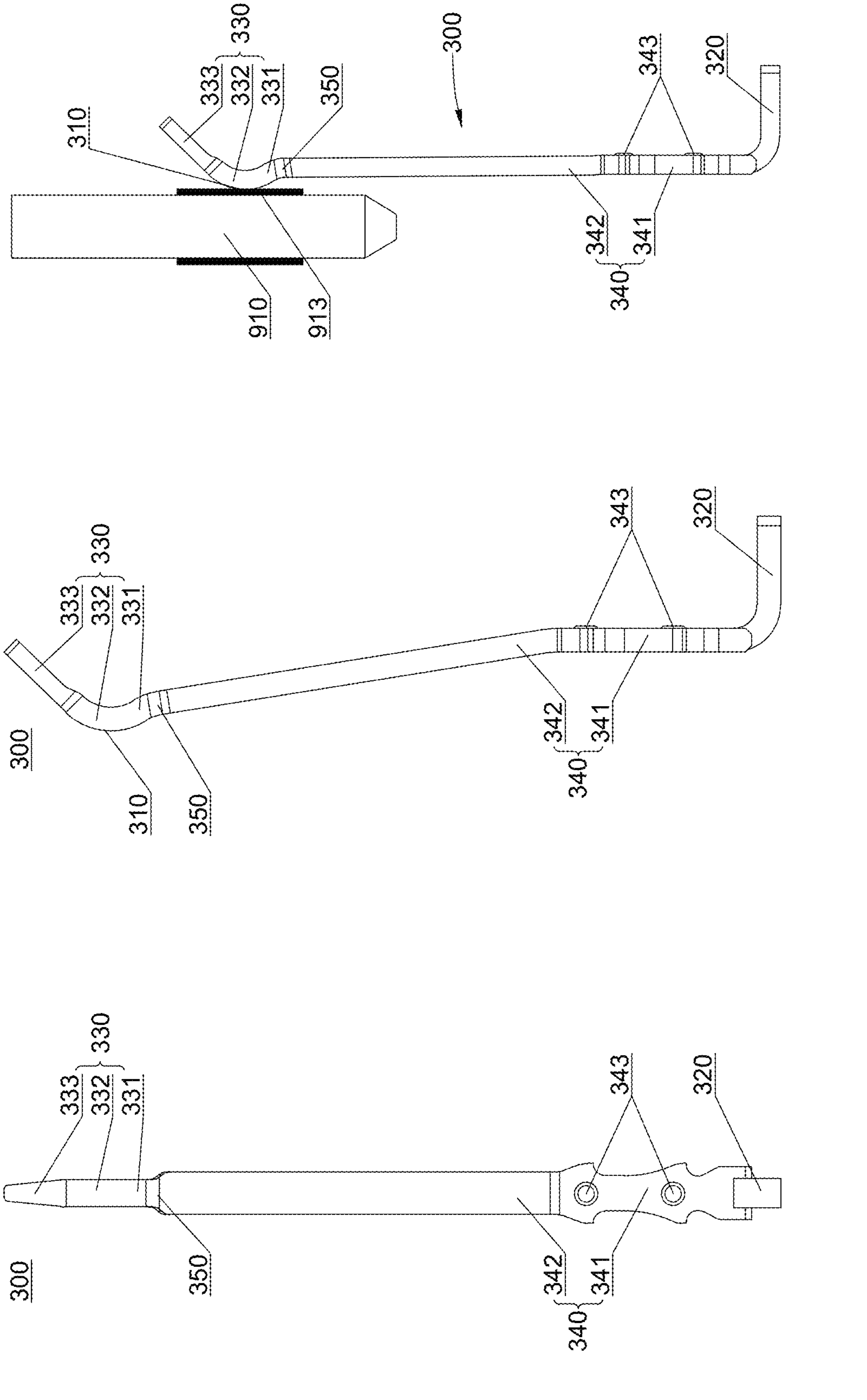
FIG. 11A is a front perspective view of a signal conductor shown in FIG. 3.
FIG. 11B is a side perspective view of the signal conductor of FIG. 11A in a free state.
FIG. 11C is a side perspective view of the signal conductor of FIG. 11A in a mated state.

In some embodiments, as shown in FIG. 4 and FIGS. 6-7, the insulating housing 200 may be provided with a plurality of signal grooves 240. The plurality of signal grooves 240 may be disposed on two sides of the slot 203. The plurality of signal conductors 300 may be mounted into the plurality of signal grooves 240 in a one-to-one correspondence manner. The signal grooves 240 may be configured to prevent that the signal conductors 300 from misalignment, thereby ensuring the stable performance of the hybrid card edge connector 100. Each of the plurality of signal grooves 240 may include an portion 241 adjacent to the mating surface. The portion 241 may have an opening 242 communicated with the signal slot 210. As shown in FIGS. 11A-11B, each of the plurality of signal conductors 300 may include an end, for example, a signal mating end 330 which will be described below. The signal conductor 300 may have elasticity. The signal mating contact portion 310 may be arranged at the said end. The end may be configured to move into the portion 241 through the opening 242 under the extrusion of the printed circuit board 910 inserted into the slot 203. Specifically, taking the embodiment shown in FIGS. 11A-11C as an example, when the printed circuit board 910 is inserted into the slot 203, the printed circuit board 910 may extrude the signal lead-in ends 330, such that the signal lead-in ends 330 move into the portions 241 through the openings 242 or at least partially moves into the portions 241. The signal conductors 300 may move towards the portions 241 during the insertion of the printed circuit board 910, such that the signal conductors 300 may apply certain pressure to the signal contacts on the printed circuit board 910, to ensure the reliability of electrical connection.

Further, as shown in FIG. 7, the portion 241 may have a reduced width along a direction away from the opening 242. Except the width of the hybrid card edge connector 100, the widths of other parts mentioned herein are the size of the parts along the longitudinal direction X-X. In this way, the portions 241 may play guiding roles. Even if the signal lead-in ends 330 deviate in the movement, the signal lead-in ends 330 may be guided into the corresponding portions 241 because of the wider openings 242. The deviated signal lead-in ends 330 may be corrected by the tapered portions 241, such that the signal lead-in ends 330 can move into the portions 241 smoothly and the printed circuit board 910 can be inserted normally.

In some embodiments, as shown in FIGS. 11A-11B, in addition to the signal mating end 330 provided with the signal mating contact portion 310, each of the plurality of signal conductors 300 may further include a signal intermediate portion 340 and a signal mounting end 320. The signal intermediate portion 340 may be connected between the signal mating end 330 and the signal mounting end 320. The signal intermediate portion 340 of the signal conductor 300 may be fixed to the corresponding signal groove 240 so as to hold the signal conductor 300 on the insulating housing 200. The signal mounting end 320 extends out of the signal groove 240 so as to be electrically connected to the printed circuit board. The signal mating end 330 may extend out of the signal groove 240. The signal mating end 330 may be disposed between the signal groove 240 and the mating surface 201. As described above, the signal mating end 330 may be movable relative to the insulating housing 200. Optionally, the signal mating end 330 may have a fixed position relative to the insulating housing 200.

A width of the signal mating end 330 may be less than a width of the signal intermediate portion 340. The signal intermediate portion 340 mainly plays a role in supporting the signal mating end 330 and the signal mounting end 320, and plays a role in fixing the signal conductor 300 into the signal groove 240. It requires that the signal intermediate portion 340 has a sufficient mechanical strength. The width of the signal mating end 330 may also be greater than the width of the signal mounting end 320. Usually, the signal mating end 330 is made of a rare material, such as noble metal; or the signal mating end 330 has a rare material coating arranged on the surface. The rare material may have more excellent electrical property. Certainly, if required, the signal mating end 330 may also have a width equivalent to the width of the signal intermediate portion 340. The width of the signal mating end 330 is smaller than the width of the signal intermediate portion 340, such that the material consumption and the volume of each signal conductor 300 can be reduced. The reduction of the raw material consumption can reduce cost.

Further, as shown in FIGS. 11A-11B, the signal mating end 330 may include a first portion 331, a third portion 332 and a second portion 333. The first portion 331 may obliquely extend towards the signal slot 210 from the signal intermediate portion 340. The third portion 332 may be connected between the first portion 331 and the second portion 333. The second portion 333 may obliquely extend away from the signal slot 210 from the third portion 332. In FIG. 11B, the signal slot 210 is disposed on the left side of the signal conductor 300. The first portion 331 may obliquely extend towards the left side from the signal intermediate portion 340. The second portion 333 may obliquely extend towards the right side from the third portion 332. The third portion 332 may protrude relative to the first portion 331 and the second portion 333. The third portion 332 may be protruded into the signal slot 210. The signal mating contact portion 310 may be arranged on the third portion 332. Through this arrangement, the signal mating end 330 may have a generally arc-shaped structure. In this way, when the printed circuit board 910 is inserted into the slot 203, a friction force between the signal mating end 330 and the printed circuit board 910 is smaller, reducing the abrasion of the signal mating end 330 and the printed circuit board 910 caused by friction, and prolonging the service life of the signal mating end 330 and the printed circuit board 910.

The tip of the signal mating end 330 may have a reduced width. Optionally, the tip may be the second portion 333. Optionally, the tip may include a second portion 333 and a third portion 332. The tip of the signal mating end 330 may be configured to have a reduce width, such that the material consumption and the volume of each signal conductor 300 can be further reduced, and the signal integrity can be improved.

As shown in FIGS. 11A-11B, a thickness of the second portion 333 may be less than that of the third portion 332 and the first portion 331. In this way, the material consumption and volume of each signal conductor 300 may be further reduced, such that the cost can be further reduced, and the signal integrity can be further improved.

In some embodiments, as shown in FIGS. 11A-11B, the signal intermediate portion 340 may include a fixed portion 341 and a power mating end 342. The fixed portion 341 may be fixed in the insulating housing 200, for example, the fixed portion 341 may be fixed in the corresponding signal groove 240. The flexible portion 342 may incline towards the signal slot 210 relative to the fixed portion 341. In the embodiments shown in the figure, the flexible portion 342 inclines towards the left side from the fixed portion 341. The flexible portion 342 may be movable relative to the insulating housing 200. The flexible portion 342 may provide elasticity for the signal conductor 300. When the printed circuit board 910 is inserted into the signal slot 210, under the action of the flexible portion 342, the signal mating end 330 with the signal mating contact portion 310 provided thereon may move away from the signal slot 210, resulting in that the signal conductor 300 can tightly presses against the signal contact 913 (such as a golden finger or a circuit) of the printed circuit board 910, as shown in FIG. 11C. In this way, it can be ensured that a reliable electrical connection is formed between the signal conductor 300 and the signal contact of the printed circuit board 910.

As shown in FIGS. 11A-11C, the fixed portion 341 may be provided with one or more protrusion(s) 343. The number and structure of the protrusion(s) 343 are not limited. Under the action of the protrusion 343, the fixed portion 341 may form an interference fit with the insulating housing 200, for example, an interference fit with the corresponding signal groove 240. Through the protrusion 343, the connection strength between the fixed portion 341 and the corresponding signal groove 240 can be improved, thereby preventing the signal conductor 300 from deviating from an expected position. Furthermore, the requirement on their processing precision is lower.

In some embodiments, as shown in FIGS. 11A-11C, the signal intermediate portion 340 and the signal mating end 330 may be connected through a transition portion 350. The transition portion 350 may bend away from the signal slot 210. The flexible portion 342 of the signal intermediate portion 340 may be connected to the third portion 332 through the transition portion 350 with a bending direction opposite to that of the third portion 332. The transition portion 350 may be shorter than the third portion 332. If the transition portion 350 and the third portion 332 have an equivalent length, it can be imagined that the third portion 332 and the transition portion 350 form a generally S-shaped structure. When the printed circuit board 910 is inserted into the slot 203, the flexible portion 342 may be deflected, as shown in FIG. 11C. In this way, the flexible portion 342 may be almost on the same line as the fixed portion 341. Due to the transition portion 350, only the signal mating contact portion 310 on the third portion 332 may be in contact with the signal contact 913 on the printed circuit board 910. A gap may be formed between the flexible portion 342 and the signal contact 913 so as to prevent the flexible portion 342 from accidentally touch the signal contact 913, thereby ensuring a safe contact state.

In some embodiments, referring to FIGS. 4, 8-10, 12A-12B and 13, the insulating housing 200 may be provided with a plurality of power grooves 250. The plurality of power grooves 250 may be disposed on two sides of the power slot 220. The power grooves 250 may include a first power groove 253 and a second power groove 254. The first power groove 253 and the second power groove 254 may be arranged on two opposite sides of the slot 203 respectively. The plurality of power conductors 400 may be mounted into the plurality of power grooves 250 in a one-to-one correspondence manner. The power conductors 400 in the first power groove 253 and the second power groove 254 may apply opposite action forces to the printed circuit board from the two sides of the printed circuit board, so as to firmly hold the printed circuit board on the insulating housing 200. The first power groove 253 and the second power groove 254 may have symmetrical structures relative to the power slot 220.

Each power conductor 400 may include a mounting base 430, a plurality of power mating ends 440 and one or more power mounting ends 420. The mounting base 430 may be held in the corresponding power groove 250. The mounting base 430 may play a role in fixing the power conductor 400 in the power groove 250, such that the power conductor 400 is held on the insulating housing 200. The plurality of power mating ends 440 may extend towards the mating surface 201 from the mounting base 430. A power mating contact portion 410 may be arranged on each of the plurality of power mating ends 440. The plurality of power mating ends 440 and the power mounting end 420 may extend out of the corresponding power groove 250. The power mounting end 420 may extend out of the insulating housing 200 from the mounting base 430, so as to be electrically connected to the printed circuit board. The plurality of power mating ends 440 may be disposed in the insulating housing 200. The power mating ends 440 may extend out of the insulating housing 200. The power mating ends 440 may be provided for each power conductor 400 to form multi-point electrical coupling with the printed circuit board 910, ensuring that reliable electrical connection can be formed between the power conductor 400 and the printed circuit board 910.

In some embodiments, as shown in FIGS. 12A-12B, each of the plurality of power mating ends 440 may include a linear portion 441, a curved portion 442 and a beam 443. The linear portion 441 may extend towards the mating surface 201 from the mounting base 430. The curved portion 442 may be connected between the linear portion 441 and the beam 443. The beam 443 may extend towards the mounting surface 202 from the curved portion 442. The power mating contact portion 410 may be arranged on the beam 443. Through this arrangement, each power mating end 440 may have a generally U-shaped structure, one end of the U-shaped power mating end 440 is connected to the mounting base 430 and the other end of the U-shaped power mating end 440 is shaped like a bent cantilever, such that the portion of the power mating end 440 where the power mating contact portion 410 is disposed has higher elasticity. In this way, the plurality of power mating ends 440 can make reliable electrical connection with the power contact of the printed circuit board 910 which is inserted into the slot 203.

As shown in FIGS. 12A-12B, the beam 443 may include a third portion 444, a second portion 445 and a first portion 446. The third portion 444 may be connected to the curved portion 442. The third portion 444 may obliquely extend towards the power slot 220 relative to the linear portion 441 from the curved portion 442. The second portion 445 may join the third portion 444 and the first portion 446. The first portion 446 may obliquely extend away from the power slot 220 relative to the linear portion 441 from the second portion 445. In the example illustrated in FIG. 12B, the power slot 220 is disposed on the right side of the power conductor 400. Therefore, the third portion 444 inclines rightwards along a downward direction. The first portion 446 inclines leftwards along the downward direction. The second portion 445 is protruded relative to the third portion 444 and the first portion 446. The second portion 445 may be protruded into the power slot 220. The power mating contact portion 410 may be arranged on the second portion 445. Through this arrangement, the beam 443 may have a generally arc-shaped structure. In this way, a friction force between the beam 443 and the printed circuit board 910 may be smaller when the printed circuit board 910 is inserted into the slot 203, such that the abrasion of the contact part 443 and the printed circuit board 910 caused by friction is reduced and the service life of the contact part 443 and the printed circuit board 910 is prolonged.

As shown in FIGS. 12A-12B, there may be a plurality of power mounting ends 420. The plurality of power mounting ends 420 may be spaced apart along the longitudinal direction X-X of the hybrid card edge connector 100. On one hand, a reliable electrical connection may be created between the power conductor 400 and the printed circuit board 920 by the plurality of power mounting ends 420; and on the other hand, the mechanical strength between the hybrid card edge connector 100 and the printed circuit board 920 may be enhanced.

For example, the mounting base 430 of the power conductor 400 may be mounted in the corresponding power groove 250 by interference fit. For example, the mounting base 430 may be provided with a protrusion, and the protrusion may tightly abut against the side wall of the power groove 250, such that the mounting base 430 may be firmly held in the power groove 250.

Figure 10:
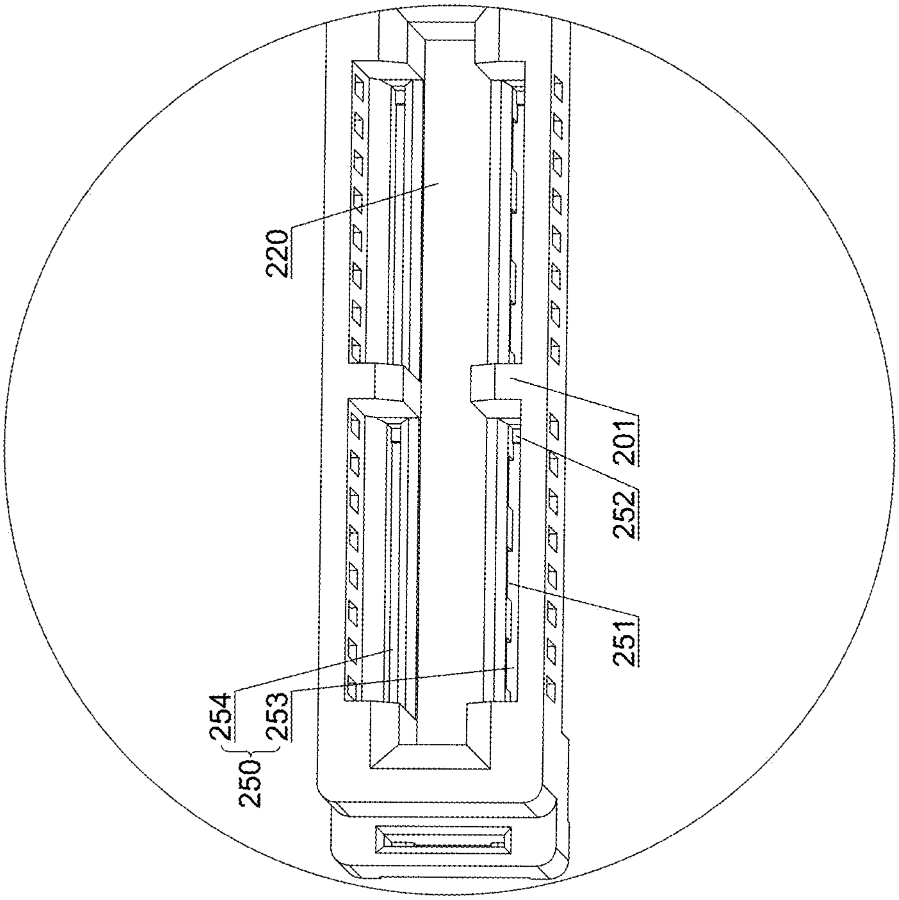
FIG. 10 is an enlarged view of a portion of the housing circled in FIG. 9.

For example, as shown in FIG. 10 and FIG. 13, an engaging portion 251 may be disposed in a side surface of each power groove 250, and a snap 431 may be arranged on a side surface of the mounting base 430 of the corresponding power conductor 400. The snap 431 is fitted in the engaging portion 251, such that the mounting base 430 is held in the power groove 250. The snap 431 and the engaging portion 251 may have various matched structures, as long as the snap 431 can be connected to the engaging portion 251 by snap-fit when the power conductor 400 is inserted into the power groove 250. In the assembling process, the power conductor 400 may be inserted into the insulating housing 200 from the mating surface 201. When the mounting base 430 is inserted into the power groove 250 in place, the snap 431 is just fitted into the engaging portion 251. Alternatively, the power conductor 400 may also be inserted into the insulating housing 200 from the mounting surface 202 until the snap 431 on the mounting base 430 is fitted in the engaging portion 251 in the side surface of the corresponding power groove 250.

As shown in FIG. 13, a cross section of the snap 431 vertical to the longitudinal direction X-X may be of a wedge shape. The wedge shape may have a reduced size along a direction facing the mounting surface 202. As shown in the figures, the top of the wedge shape may be wider than the bottom. Each power conductor 400 may be inserted into the corresponding power groove 250 from the mating surface 201. The snap 431 may be easily fitted into the engaging portion 251. In the case that the upper part of the power conductor 400 where the power mating end 440 is disposed is bent, it may be more convenient to mount the power conductor 400 in a direction from the mating surface 201 to the mounting surface 202 (that is, a direction from top to bottom as shown in FIG. 13).

The insulating housing 200 may be made by molding. As illustrated, the engaging portion 251 may extend downwards to the bottom surface of the power groove 250. i.e., extend to the mounting surface 202. When the insulating housing 200 is viewed from the mounting surface 202, as shown in FIG. 8, a notch formed by the engaging portion 251 on the mounting base 202 can be seen. In this case, the engaging portion 251 may prevent the snap 431 from being separated from the above. Optionally, a limiter may be arranged on each power conductor 400. A mated limiter may be arranged in the corresponding power groove 250. When the snap 431 is fitted into the engaging portion 251 in place, the limiter and the mated limiter may abut against each other. In this way, the snap 431 may be prevented from excessively entering into the engaging portion 251, which may result in that the power conductor 400 is loose from the insulating housing 200. The limiter and the mated limiter may be used cooperatively with any of other embodiments. For example, in the embodiments where the engaging portion 251 does not extend to the mounting surface 202, the limiter and the mated limiter may also be provided.

Figure 9:
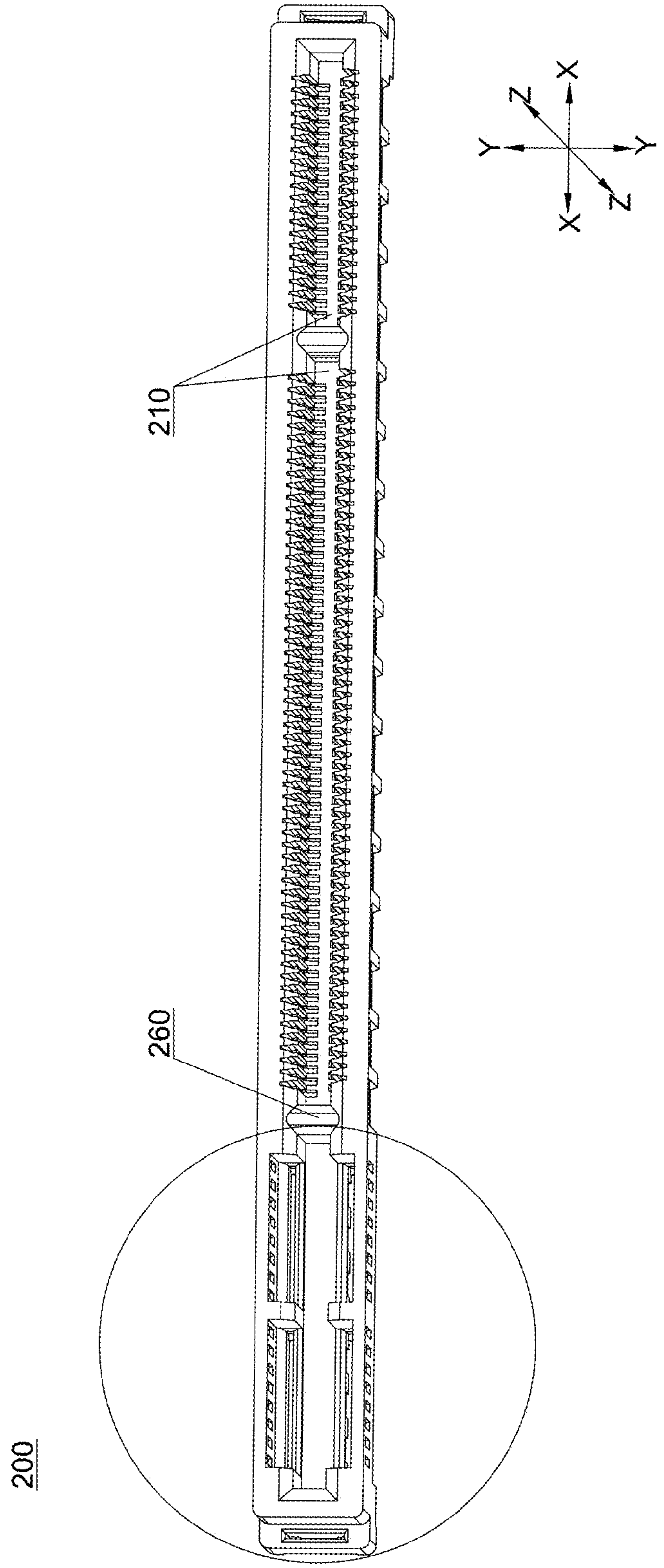
FIG. 9 is a top perspective view of the housing shown in FIG. 3.

For example, the power groove 250 may extend along the power slot 220, as shown in FIG. 9. The engaging portion 251 may be arranged on a side surface of the power groove 250 extending along the power slot 220. Projecting platforms 252 may be arranged at two ends of each power groove 250 respectively. The projecting platforms 252 may form mated limiters. When the mounting base 430 of the power conductor 400 is mounted in the corresponding power groove 250 in place, the snap 431 may be fitted to the engaging portion 251, and steps 402 (as shown in FIG. 12A) on two sides of the power conductor 400 abut against the projecting platform 252, respectively. The steps 402 may form the limiters. The steps 402 may be formed by corners of the mounting base 430 facing the mounting surface 202. The power mounting end 420 may be narrower than the mounting base 430 along the longitudinal direction X-X, thereby forming the steps 402.

The power mating end 440 may extend towards the mating surface 201 from the mounting base 430 along the vertical direction Z-Z. The linear portion 441 and the mounting base 430 may be disposed in the same vertical plane. Optionally, each power conductor 400 may further include a transition portion 450. The transition portion 450 may have two opposite ends (for example, an upper end and a lower end in FIG. 12B), wherein one end is connected to the mounting base 430 and the other end is connected to the power mating end 440. The transition portion 450 may bend away from the power slot 220 from the mounting base 430. The transition portion 450 may abut against the edge of the opening 2501 of the corresponding power groove 250. In this way, the transition portion 450 may play a limiting role, thereby preventing the power conductor 400 from being excessively inserted into the power groove 250. Furthermore, the upper end of the transition portion 450 may be disposed on an outer side of the lower end of the transition portion 450, since the transition portion 450 may bend away from the power slot 220 from the mounting base 430, such that a sufficient accommodating space may be provided for the bent power mating end 440. Further, as shown in FIG. 13, the transition portion 450 bending outwards may make the lower portion of the insulating housing 200 provided with the power groove 250 narrower than the upper portion of the insulating housing 200, since the upper portion may need to provide an accommodating space for the power mating end 440. The signal mounting end 320 may not extend beyond the side surface of the insulating housing 200 along the transverse direction Y-Y. Therefore, the footprint of the hybrid card edge connector 100 may be reduced, and the integration level of the electronic system using the hybrid card edge connector 100 may be increased.

In addition, in the embodiments where each power conductor 400 includes a plurality of power mounting ends 420, the plurality of power mounting ends 420 may be spaced apart along the longitudinal direction X-X of the hybrid card edge connector 100. A snap 431 may be arranged above each power mounting end 420. Each snap 431 may be not necessarily disposed over and aligned with the corresponding power mounting end 420. As shown in FIG. 2, the power mounting end 420 may be connected to the hole 923 of the printed circuit board 920. The power mounting end 420 may have the effect of fixing the hybrid card edge connector 100 to the printed circuit board 920. In this case, it is expected that the mechanical connection between the power mounting end 420 and the power groove 250 can be more reliable at a position above the power mounting end 420, since the position above the power mounting end 420 may have higher stability relative to the printed circuit board 920 after the power mounting end 420 is fixed to the printed circuit board 920. When one or more of connecting points between the insulating housing 200 and the power conductor 400 is disposed above the power mounting end 420, the insulating housing 200 may have higher stability relative to the printed circuit board 920.

Figure 3:
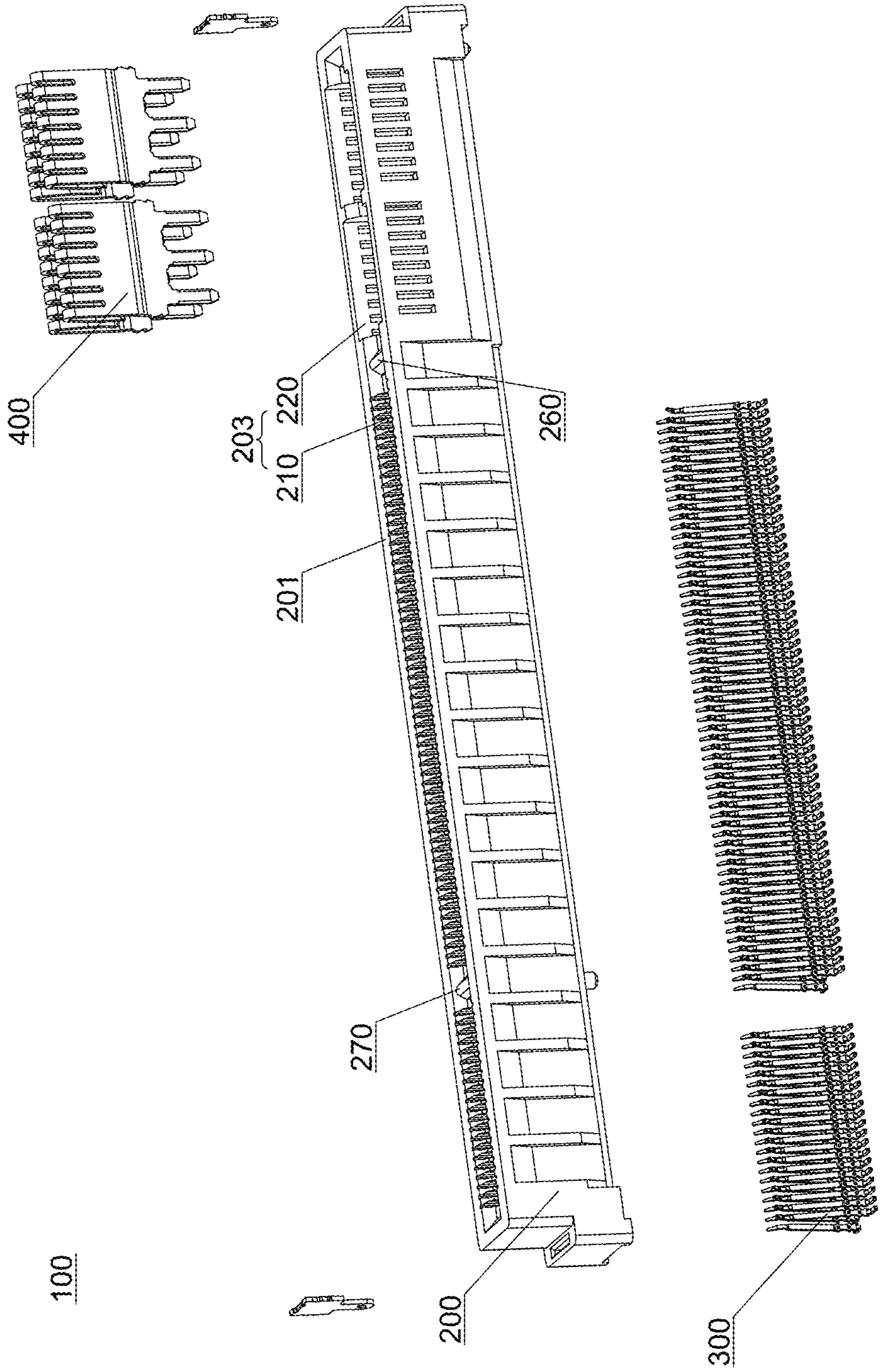
FIG. 3 is an exploded perspective view of a hybrid card edge connector shown in FIG. 2.
Figure 14:
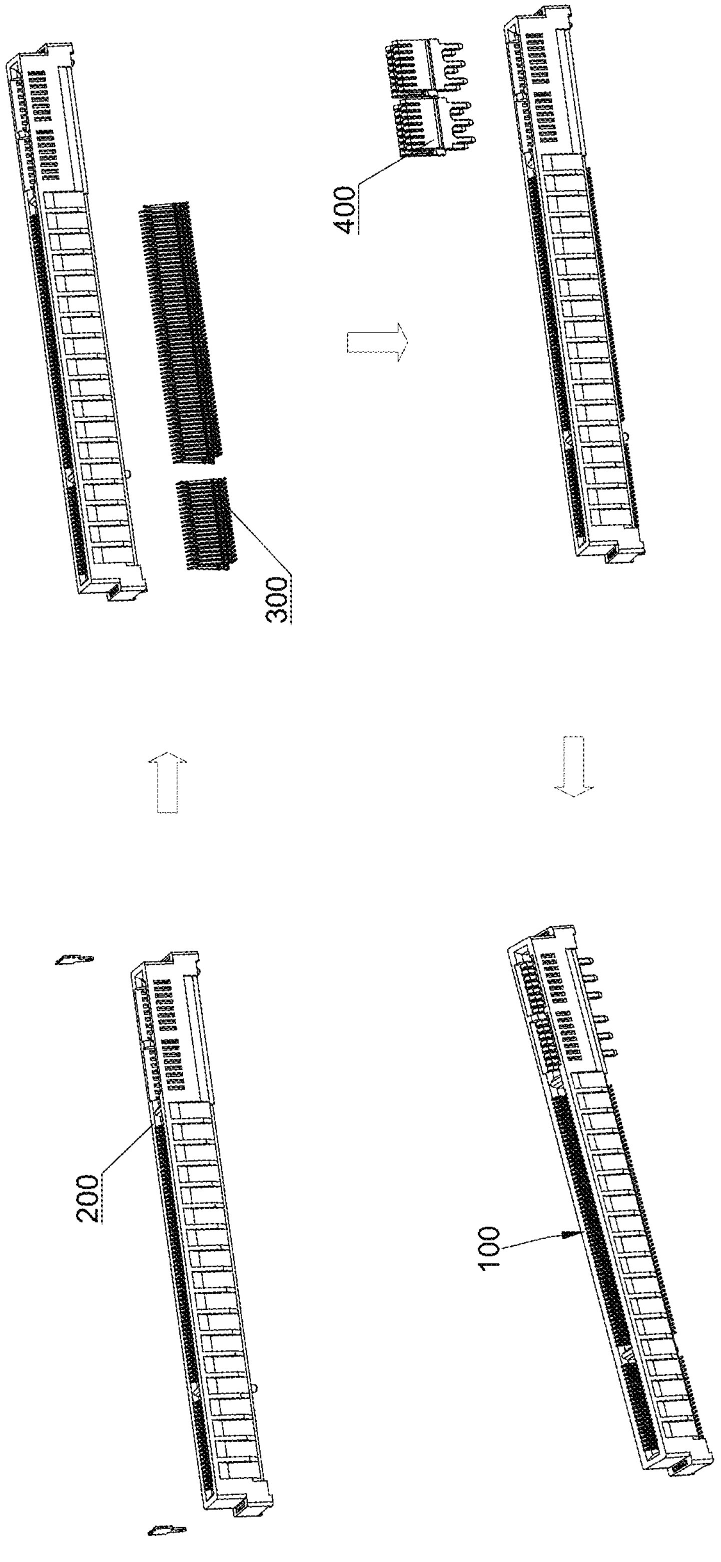
FIG. 14 is a schematic diagram showing a method of manufacturing the hybrid card edge connector of FIG. 4, according to some embodiments.

A method for assembling the hybrid card edge connector 100 is provided, referring to FIG. 3, FIG. 4 and FIG. 14. According to an order indicated by the arrows in the figure, firstly, the signal conductor 300 may be inserted into the slot 203 from one side of the mounting surface 202 of the insulating housing 200. Then, the power conductor 400 may be inserted into the slot 203 from one side of the mating surface 201 of the insulating housing 200. In this way, assembling of the hybrid card edge connector 100 is completed. It should be noted that the sequence of inserting the signal conductor 300 and the power conductor 400 into the slot 203 may be changed, or the signal conductor 300 and the power conductor 400 may be inserted into the slot 203 at the same time. Certainly, the method is only exemplarily, the hybrid card edge connector 100 may also be assembled in any other appropriate methods.

The present disclosure has been described through the above embodiments, but it should be understood that the above embodiments are only for the purpose of illustration and description, and are not intended to limit the present disclosure to the scope of the described embodiments. In addition, it may be understood by a person skilled in the art that the present disclosure is not limited to the above embodiments, a variety of variations and modifications may be made according to the teaching of the present disclosure, and these variations and modifications all fall within the scope of protection of the present disclosure. The scope of protection of the present disclosure is defined by the appended claims and its equivalent scope.

Moreover, although many creative aspects have been described above with reference to the card edge connector, it should be understood that the aspects of the present disclosure are not limited to these. Any one of the creative features, whether alone or combined with one or more other creative features, can also be used for other types of electrical connectors, such as right angle connectors and coplanar connectors.

In the description of the present disclosure, it is to be understood that orientation or positional relationships indicated by orientation words "front', "rear", "upper", "lower", "left", "right", "transverse direction", "vertical direction", "perpendicular", "horizontal", "top", "bottom" and the like usually are shown based on the accompanying drawings, only for the purposes of the ease in describing the present disclosure and simplification of its descriptions. Unless stated to the contrary, these orientation words do not indicate or imply that the specified apparatus or element has to be specifically disposed, and structured and operated in a specific direction, and therefore, should not be understood as limitations to the present disclosure. The orientation words "inside" and "outside" refer to the inside and outside relative to the contour of each component itself.

For facilitating description, the spatial relative terms such as "on", "above", "on an upper surface of" and "upper" may be used here to describe a spatial position relationship between one or more components or features and other components or features shown in the accompanying drawings. It should be understood that the spatial relative terms not only include the orientations of the components shown in the accompanying drawings, but also include different orientations in use or operation. For example, if the component in the accompanying drawings is turned upside down completely, the component "above other components or features" or "on other components or features" will include the case where the component is "below other components or features" or "under other components or features". Thus, the exemplary term "above" can encompass both the orientations of "above" and "below". In addition, these components or features may be otherwise oriented (for example rotated by 90 degrees or other angles) and the present disclosure is intended to include all these cases.

It should be noted that the terms used herein are only for describing specific embodiments, and are not intended to limit the exemplary embodiments according to the present application. As used herein, an expression of a singular form includes an expression of a plural form unless otherwise indicated. In addition, the use of "including", "comprising", "having", "containing", or "involving", and variations thereof herein, is meant to encompass the items listed thereafter (or equivalents thereof) and/or as additional items.

It should be noted that the terms "first", "second" and the like in the description and claims, as well as the above accompanying drawings, of the present disclosure are used to distinguish similar objects, but not necessarily used to describe a specific order or precedence order. It should be understood that ordinal numbers used in this way can be interchanged as appropriate, so that the embodiments of the present disclosure described herein can be implemented in a sequence other than those illustrated or described herein.

What is claimed is:

1. A card edge connector, comprising:

a housing comprising first and second walls extending in a longitudinal direction and separated from each other by a slot, and one or more ribs joining the first and second walls and separating the slot into two or more portions;

a plurality of first type conductors, each of the plurality of first type conductors comprising a mating end, a mounting end opposite the mating end and comprising a mounting contact portion, and an intermediate portion joining the mating end and the mounting end, the mating end comprising a mating contact portion curving into a first portion of the two or more portions of the slot, wherein the mounting contact portions of the plurality of first type conductors are configured to have a pitch with a value between 0.60 mm and 0.70 mm; and a plurality of second type conductors, each of the plurality of second type conductors comprising a mating end, a mounting end opposite the mating end, and an intermediate portion joining the mating end and the mounting end, the mating end comprising a plurality of mating contact portions curving into a second portion of the two or more portions of the slot.

2. The card edge connector of claim 1, wherein:

the plurality of first type conductors are configured for transmitting signals, and the plurality of second type conductors are configured for transmitting power.

3. The card edge connector of claim 1, comprising:

a plurality of ribs extending in a vertical direction perpendicular to the longitudinal direction on outside surfaces of the first and second walls corresponding to the first portion of the two or more portions of the slot; and a plurality of openings through the first and second walls corresponding to the second portion of the two or more portions of the slot.

4. The card edge connector of claim 1, wherein:

the mounting contact portions of the plurality of first type conductors are configured to mount to a surface of a printed circuit board, and the mounting contact portions of the plurality of second type conductors are configured to insert into holes of the printed circuit board.

5. The card edge connector of claim 1, wherein:

the housing has a width in a transverse direction perpendicular to the longitudinal direction, the plurality of first type conductors are disposed in first and second rows along the first and second walls, respectively, and distal ends of the mounting ends of the first type conductors in the first row are separated from distal ends of the mounting ends of the first type conductors in the second row by a distance in the transverse direction that is less than the width of the housing.

6. The card edge connector of claim 5, wherein:

the first type conductors in the first row are offset with respect to the first type conductors in the second row in the longitudinal direction.

7. The card edge connector of claim 1, wherein:

the housing comprises:

a mounting surface, and first and second posts extending from the mounting surface and spaced away from each other, the first and second posts having cross-sections of different shapes; and the mounting ends extend out of the housing through the mounting surface.

8. A card edge connector, comprising:

a housing comprising first and second walls extending in a longitudinal direction and separated from each other by a slot, each of the first and second walls comprising a plurality of first type grooves and a plurality of second type grooves;

a plurality of first type conductors disposed in the plurality of first type grooves and each comprising a mating contact portion curving into the slot and a mounting contact portion extending out of the housing, wherein each of the plurality of first type grooves comprises a tapered portion configured to hold the mating contact portion of a respective first type conductor; and a plurality of second type conductors disposed in the plurality of second type grooves and each comprising a plurality of mating contact portions curving into the slot and a plurality of mounting contact portions extending out of the housing.

9. The card edge connector of claim 8, wherein:

the plurality of first type grooves each has a width in the longitudinal direction that reduces in a transverse direction perpendicular to the longitudinal direction.

10. The card edge connector of claim 9, wherein:

the plurality of second type grooves each has a width in the longitudinal direction that is greater than the width of each of the plurality of first type grooves in the longitudinal direction.

11. The card edge connector of claim 8, wherein each of the plurality of first type conductor comprises a mating end comprising a first portion extending towards the slot, a second portion extending away from the slot, and the mating contact portion joining the first portion and the second portion.

12. The card edge connector of claim 11, wherein each of the plurality of second type conductor comprises a mating end comprising the plurality of mating contact portions, a mounting end comprising the plurality of mounting contact portions, and a base between the mating end and the mounting end and configured to mount to one of the plurality of second type grooves.

13. The card edge connector of claim 11, wherein:

each of the plurality of second type conductor has a first number of mating contact portions and a second number of mounting contact portions, and the first number is greater than the second number.

14. The card edge connector of claim 8, wherein:

the mounting contact portions of the plurality of first type conductors are configured to have a first pitch, the mounting contact portions of the plurality of second type conductors are configured to have a second pitch, and the first pitch is smaller than the second pitch.

15. The card edge connector of claim 14, wherein:

the first pitch has a value between 0.60 mm and 0.70 mm.

16. The card edge connector of claim 8, wherein:

a first number of the second plurality of mounting contact portions correspond to a second number of the second plurality of mating contact portions, and the second number is greater than the first number.

17. A card edge connector, comprising:

a housing comprising first and second walls extending in a longitudinal direction and separated from each other by a slot;

a plurality of mating contact portions curving into the slot; and a plurality of mounting contact portions extending out of the housing, the plurality of mounting contact portions comprising a first plurality of mounting contact portions having a first pitch and a second plurality of mounting contact portions having a second pitch, wherein the first pitch is smaller than the second pitch, wherein:

the first plurality of mounting contact portions are configured to mount to a surface of a printed circuit board, the second plurality of mounting contact portions are configured to insert into holes of the printed circuit board, and a first number of the second plurality of mounting contact portions corresponds to a second number of the second plurality of mating contact portions, and the second number is greater than the first number.

18. The card edge connector of claim 17, wherein:

the first pitch has a value between 0.60 mm and 0.70 mm.

19. The card edge connector of claim 17, wherein:

the plurality of mating contact portions comprise a first plurality of mating contact portions having a third pitch and a second plurality of mating contact portions having a fourth pitch, the third pitch equals to the first pitch, and the fourth pitch is smaller than the second pitch.

20. The card edge connector of claim 17, wherein:

the first plurality of mounting contact portions each corresponds to a respective one of the first plurality of mating contact portions.

* * * * *